(12) United States Patent
Zantout et al.

(10) Patent No.: US 10,186,801 B2
(45) Date of Patent: Jan. 22, 2019

(54) LOW VOLTAGE BUSS SYSTEM

(71) Applicant: IDEAL Industries, Inc., Sycamore, IL (US)

(72) Inventors: Alan Emad Zantout, Sycamore, IL (US); Benjamin David Swedberg, Sycamore, IL (US); Trevor Don Fildes, Sycamore, IL (US)

(73) Assignee: IDEAL Industries, Inc., Sycamore, IL (US)

( * ) Notice: Subject to any disclaimer, the term of this patent is extended or adjusted under 35 U.S.C. 154(b) by 276 days.

(21) Appl. No.: 14/986,225

(22) Filed: Dec. 31, 2015

(65) Prior Publication Data

US 2016/0268728 A1    Sep. 15, 2016

Related U.S. Application Data

(63) Continuation-in-part of application No. 14/857,918, filed on Sep. 18, 2015, now Pat. No. 9,912,100, which is a continuation-in-part of application No. 14/030,768, filed on Sep. 18, 2013, now Pat. No. 9,847,636.

(Continued)

(51) Int. Cl.
*H01R 13/62* (2006.01)
*G06F 1/20* (2006.01)
(Continued)

(52) U.S. Cl.
CPC .......... *H01R 13/6205* (2013.01); *G06F 1/20* (2013.01); *G06F 1/266* (2013.01);
(Continued)

(58) Field of Classification Search
CPC ........................... H01R 13/6205; G06F 1/266
See application file for complete search history.

(56) References Cited

U.S. PATENT DOCUMENTS

| 1,697,449 A | 1/1929 | Anderson |
| 2,250,513 A | 7/1941 | Von Gehr |

(Continued)

FOREIGN PATENT DOCUMENTS

| EP | 0200473 | 11/1986 |
| EP | 0725992 | 8/1998 |

(Continued)

OTHER PUBLICATIONS

Merriam-webster, "definition of ferrous," pp. 1.*

(Continued)

*Primary Examiner* — Thienvu Tran
*Assistant Examiner* — Pinping Sun
(74) *Attorney, Agent, or Firm* — Greenberg Traurig, LLP

(57) ABSTRACT

An electrical buss has a carrier and at least a pair of electrically conductive elements. The at least a pair of electrically conductive elements extend linearly along a length of the carrier and at least a portion of each of the least a pair of electrically conductive elements is exposed at a surface of the carrier. A connector is releasably couplable to the electrical buss adjacent to the surface of the carrier. The connector has at least a pair of electrically conductive contacts for engaging with the electrically conductive elements at any desired location along the length of the carrier.

14 Claims, 45 Drawing Sheets

Related U.S. Application Data

(60) Provisional application No. 61/725,795, filed on Nov. 13, 2012, provisional application No. 61/768,907, filed on Feb. 25, 2013, provisional application No. 61/744,777, filed on Oct. 3, 2012, provisional application No. 61/744,779, filed on Oct. 3, 2012.

(51) Int. Cl.
| | |
|---|---|
| G06F 1/26 | (2006.01) |
| H05B 33/08 | (2006.01) |
| H05B 37/02 | (2006.01) |
| G06F 13/40 | (2006.01) |
| H01R 25/14 | (2006.01) |

(52) U.S. Cl.
CPC ..... *G06F 13/4068* (2013.01); *H05B 33/0803* (2013.01); *H05B 37/0254* (2013.01); *H01R 25/147* (2013.01); *Y10T 307/25* (2015.04)

(56) References Cited

U.S. PATENT DOCUMENTS

| | | | |
|---|---|---|---|
| 2,261,986 A | 11/1941 | Frank et al. | |
| 2,360,420 A | 10/1944 | Hill | |
| 2,924,804 A | 2/1960 | Frank et al. | |
| 3,295,093 A | 12/1966 | Neumann et al. | |
| 4,300,185 A | 11/1981 | Wakamatsu | |
| 4,468,547 A | 8/1984 | Belttary | |
| 4,655,520 A | 4/1987 | Cummings | |
| 4,768,964 A | 9/1988 | Zucchini | |
| 4,874,322 A | 10/1989 | Dola et al. | |
| 4,951,029 A | 8/1990 | Severson | |
| 4,974,302 A | 8/1990 | Callahan | |
| 4,981,438 A | 1/1991 | Bekhiet | |
| 5,110,300 A | 5/1992 | Woodgate | |
| 5,152,698 A | 10/1992 | Juhlin et al. | |
| 5,155,955 A | 10/1992 | Ball et al. | |
| 5,157,273 A | 10/1992 | Medendorp et al. | |
| 5,160,188 A | 11/1992 | Rorke et al. | |
| 5,164,609 A | 11/1992 | Poppe et al. | |
| 5,226,705 A | 7/1993 | Rorke et al. | |
| 5,244,401 A | 9/1993 | Russell et al. | |
| 5,252,086 A | 10/1993 | Russell et al. | |
| 5,258,899 A | 11/1993 | Chen | |
| 5,277,609 A | 1/1994 | Ondrejka | |
| 5,299,947 A | 4/1994 | Barnard | |
| 5,336,849 A | 8/1994 | Whitney | |
| 5,340,322 A | 8/1994 | Poulsen | |
| 5,603,621 A | 2/1997 | Elmouchi | |
| 5,606,919 A | 3/1997 | Fox et al. | |
| 5,607,317 A | 3/1997 | King et al. | |
| 5,646,594 A | 7/1997 | Barben, Jr. et al. | |
| 5,684,469 A | 11/1997 | Toms et al. | |
| 5,759,051 A * | 6/1998 | Cancellieri | H01R 25/142 439/118 |
| 5,788,517 A | 8/1998 | Elmouchi | |
| 5,907,285 A | 5/1999 | Toms et al. | |
| 5,939,862 A | 8/1999 | Kates et al. | |
| 5,942,984 A | 8/1999 | Toms et al. | |
| 6,046,513 A | 4/2000 | Jouper et al. | |
| 6,078,113 A | 6/2000 | True et al. | |
| 6,123,562 A | 9/2000 | King et al. | |
| 6,133,845 A | 10/2000 | Toms et al. | |
| 6,166,496 A | 12/2000 | Lys et al. | |
| 6,168,282 B1 | 1/2001 | Chien | |
| 6,211,796 B1 | 4/2001 | Toms et al. | |
| 6,231,205 B1 | 5/2001 | Slesinger et al. | |
| 6,313,549 B1 | 11/2001 | Moisan et al. | |
| 6,424,248 B1 | 7/2002 | Toms et al. | |
| 6,527,406 B1 | 3/2003 | Slesinger et al. | |
| 6,585,529 B2 | 7/2003 | Zakerzewski | |
| 6,634,895 B2 | 10/2003 | Agro | |
| 6,830,468 B2 | 12/2004 | Schaerer et al. | |
| 6,935,763 B2 | 8/2005 | Mueller et al. | |
| 7,320,610 B2 | 1/2008 | Boike | |
| 7,351,075 B1 | 4/2008 | Patterson et al. | |
| 7,374,444 B1 | 5/2008 | Bennett | |
| 7,438,566 B2 * | 10/2008 | Chen | H01R 25/145 439/110 |
| 7,455,535 B2 | 11/2008 | Insalaco et al. | |
| 7,648,379 B2 | 1/2010 | Johnson et al. | |
| 7,654,834 B1 | 2/2010 | Mier-Langner et al. | |
| 7,697,268 B2 | 4/2010 | Johnson et al. | |
| 7,726,974 B2 | 6/2010 | Shah et al. | |
| 7,762,821 B2 | 7/2010 | Patterson et al. | |
| 7,841,878 B2 | 11/2010 | Johnson et al. | |
| 7,893,567 B1 | 2/2011 | Deros et al. | |
| 7,955,106 B1 | 6/2011 | Crow et al. | |
| 7,993,150 B1 | 8/2011 | Crow et al. | |
| 7,997,910 B2 | 8/2011 | Myers et al. | |
| 8,016,457 B2 | 9/2011 | Clark et al. | |
| 8,061,864 B2 | 11/2011 | Metcalf et al. | |
| 8,106,541 B1 | 1/2012 | Sarullo | |
| 8,147,257 B2 | 4/2012 | Bury et al. | |
| 8,172,588 B2 | 5/2012 | Johnson et al. | |
| 8,172,589 B2 | 5/2012 | Johnson et al. | |
| 8,184,445 B2 | 5/2012 | Jacobs et al. | |
| 8,262,244 B2 | 9/2012 | Metcalf et al. | |
| 8,314,336 B2 | 11/2012 | Liang et al. | |
| 8,985,813 B2 | 3/2015 | Zaderej et al. | |
| 9,765,954 B2 * | 9/2017 | Zaderej | F21S 6/003 |
| 2003/0171017 A1 | 9/2003 | Schaerer et al. | |
| 2004/0026998 A1 | 2/2004 | Henriott et al. | |
| 2004/0154233 A1 | 8/2004 | Hodges et al. | |
| 2004/0165330 A1 * | 8/2004 | Wolinsky | H01R 25/14 361/115 |
| 2005/0079769 A1 | 4/2005 | Strayer | |
| 2005/0250389 A1 | 11/2005 | Johansen et al. | |
| 2006/0194467 A1 * | 8/2006 | Beasley | H01R 13/6641 439/339 |
| 2007/0279895 A1 | 12/2007 | Clark et al. | |
| 2008/0164934 A1 * | 7/2008 | Hankey | H01R 13/2428 327/407 |
| 2009/0042428 A1 | 2/2009 | Henriott et al. | |
| 2009/0052122 A1 | 2/2009 | Ross et al. | |
| 2009/0152944 A1 | 6/2009 | Baine et al. | |
| 2009/0278494 A1 | 11/2009 | Randall | |
| 2009/0279298 A1 * | 11/2009 | Mier-Langner | F21V 21/096 362/235 |
| 2010/0008072 A1 | 1/2010 | Maier-Graichen et al. | |
| 2011/0076876 A1 | 3/2011 | Fleisig | |
| 2011/0084627 A1 | 4/2011 | Sloan et al. | |
| 2012/0002356 A1 | 1/2012 | Linnane et al. | |
| 2012/0075857 A1 * | 3/2012 | Verbrugh | F21S 8/038 362/249.01 |
| 2012/0208378 A1 | 8/2012 | Rudisill et al. | |
| 2012/0295451 A1 | 11/2012 | Hyun-Jun et al. | |
| 2013/0294081 A1 | 11/2013 | O'Connor et al. | |
| 2013/0335983 A1 | 12/2013 | Nicieja et al. | |
| 2013/0337668 A1 * | 12/2013 | Ernest | H01R 25/147 439/110 |
| 2014/0099808 A1 * | 4/2014 | McClelland | H01R 13/6205 439/153 |
| 2014/0167501 A1 | 6/2014 | Marosi et al. | |
| 2014/0224875 A1 * | 8/2014 | Slesinger | H01R 25/142 235/385 |
| 2014/0285957 A1 * | 9/2014 | Rohrbach | H01R 13/6205 361/679.02 |
| 2014/0293544 A1 | 10/2014 | Zaderej et al. | |

FOREIGN PATENT DOCUMENTS

| | | |
|---|---|---|
| EP | 0746950 | 7/2002 |
| JP | 2005094843 | 4/2005 |
| WO | 9319506 | 9/1993 |

OTHER PUBLICATIONS

Merriam-webster,"definition of ferromagnetic," pp. 1.*
Eubiq,"The world's most flexible power outlet system," 2010,pp. 1-4.*

(56) References Cited

OTHER PUBLICATIONS

ISA/US, International Search Report and Written Opinion issued on PCT/US2013/061933, dated Apr. 30, 2014, 11 pgs.
European Patent Office, European Search Report issued on EP patent application No. 13844326.2, dated Apr. 22, 2016, 7 pages.
ISA/US, International Search Report and Written Opinion issued on PCT application No. US16/052095, dated Jan. 30, 2017, 12 pages.
Japanese Patent Office, Office Action issued on Japanese patent application No. 2015-535702, dated Aug. 1, 2017, 1 page.

* cited by examiner

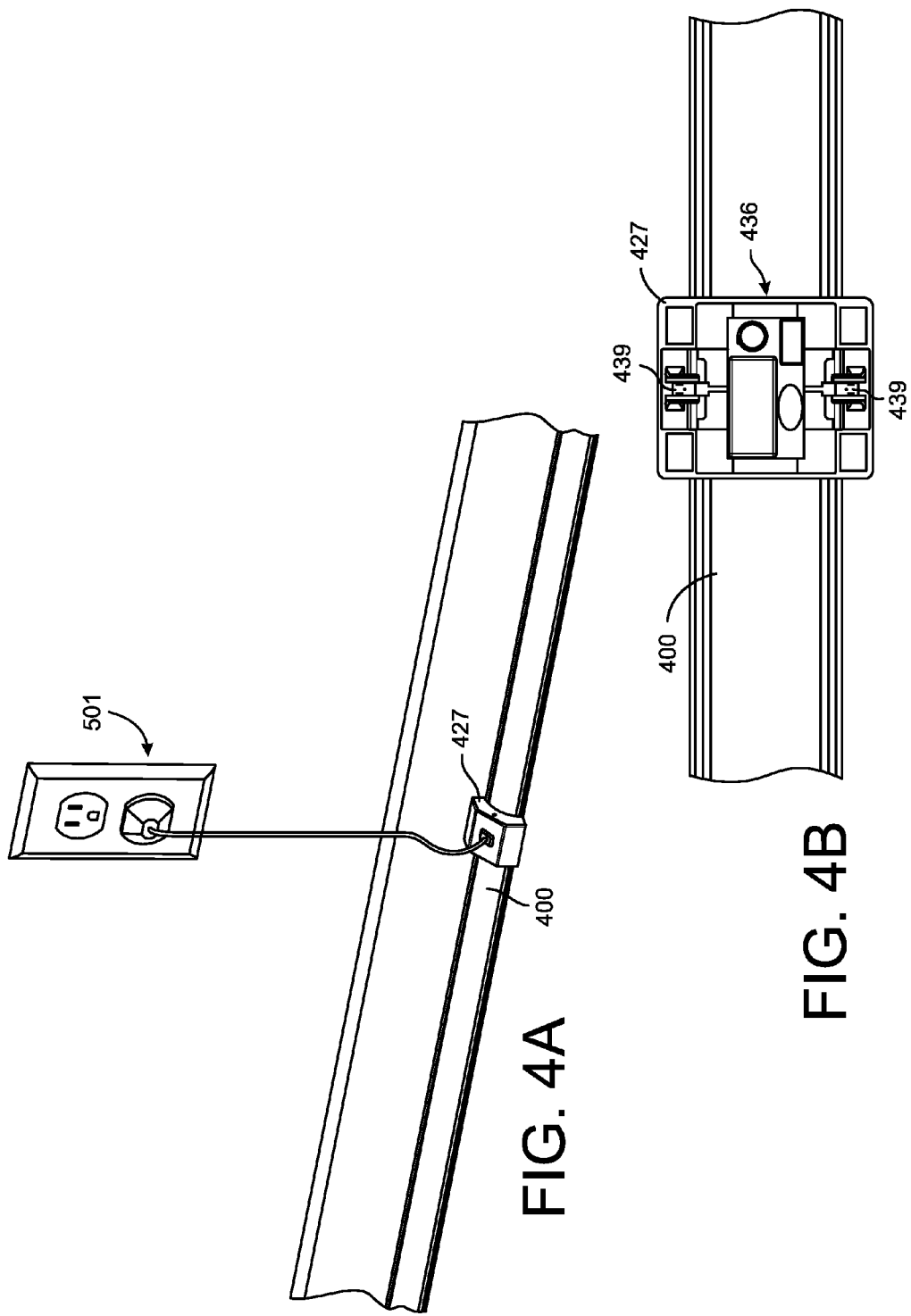

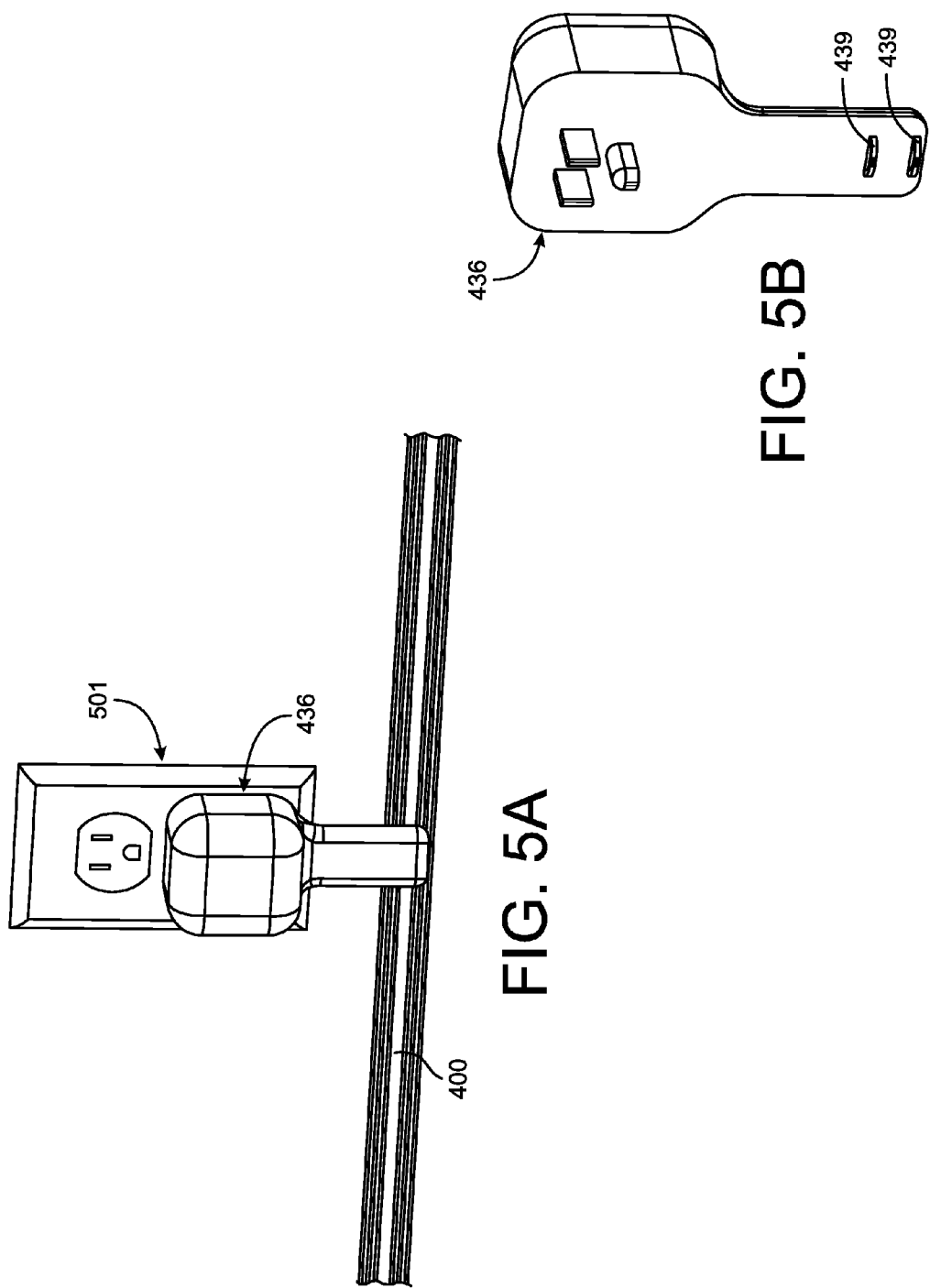

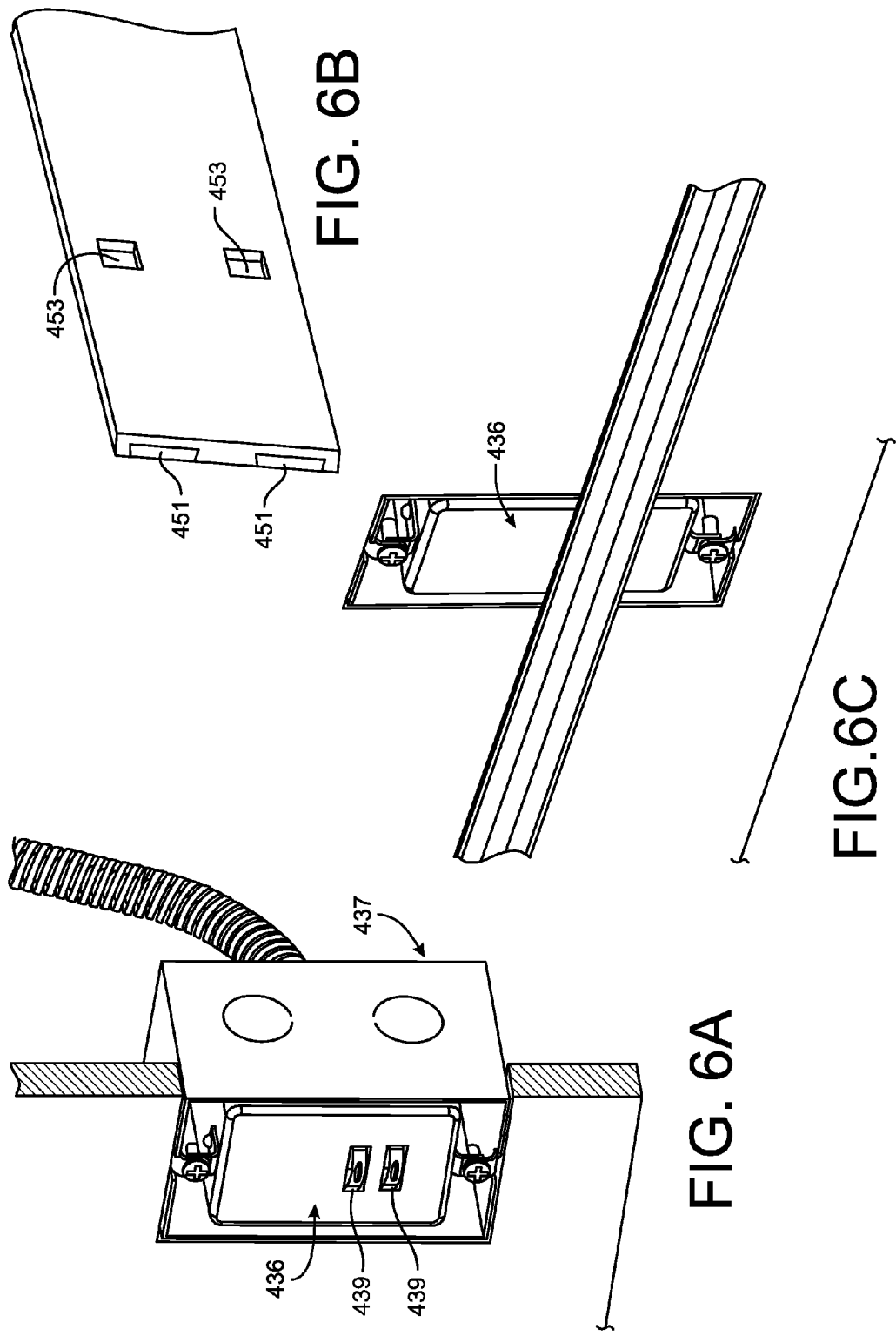

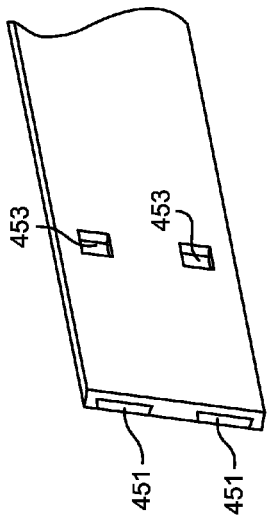
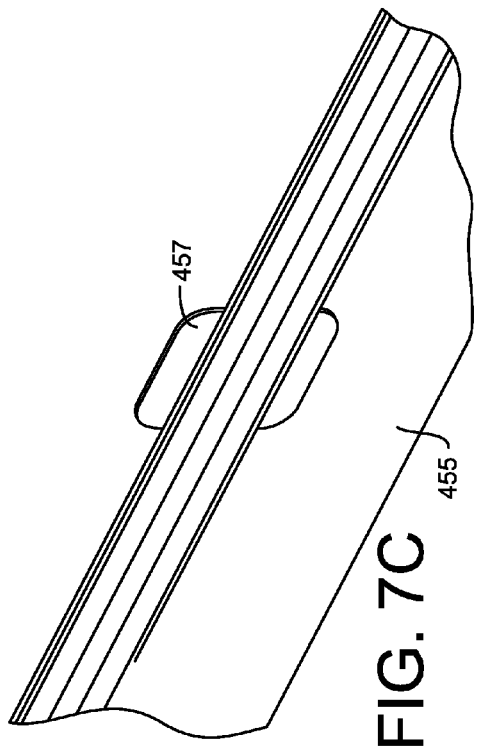
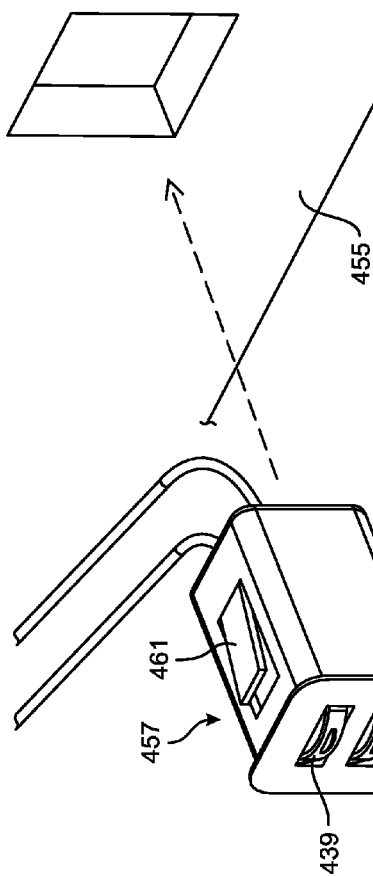
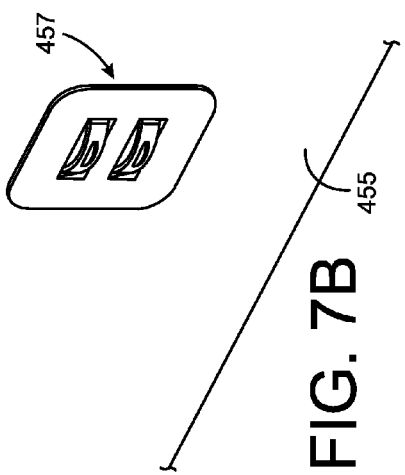

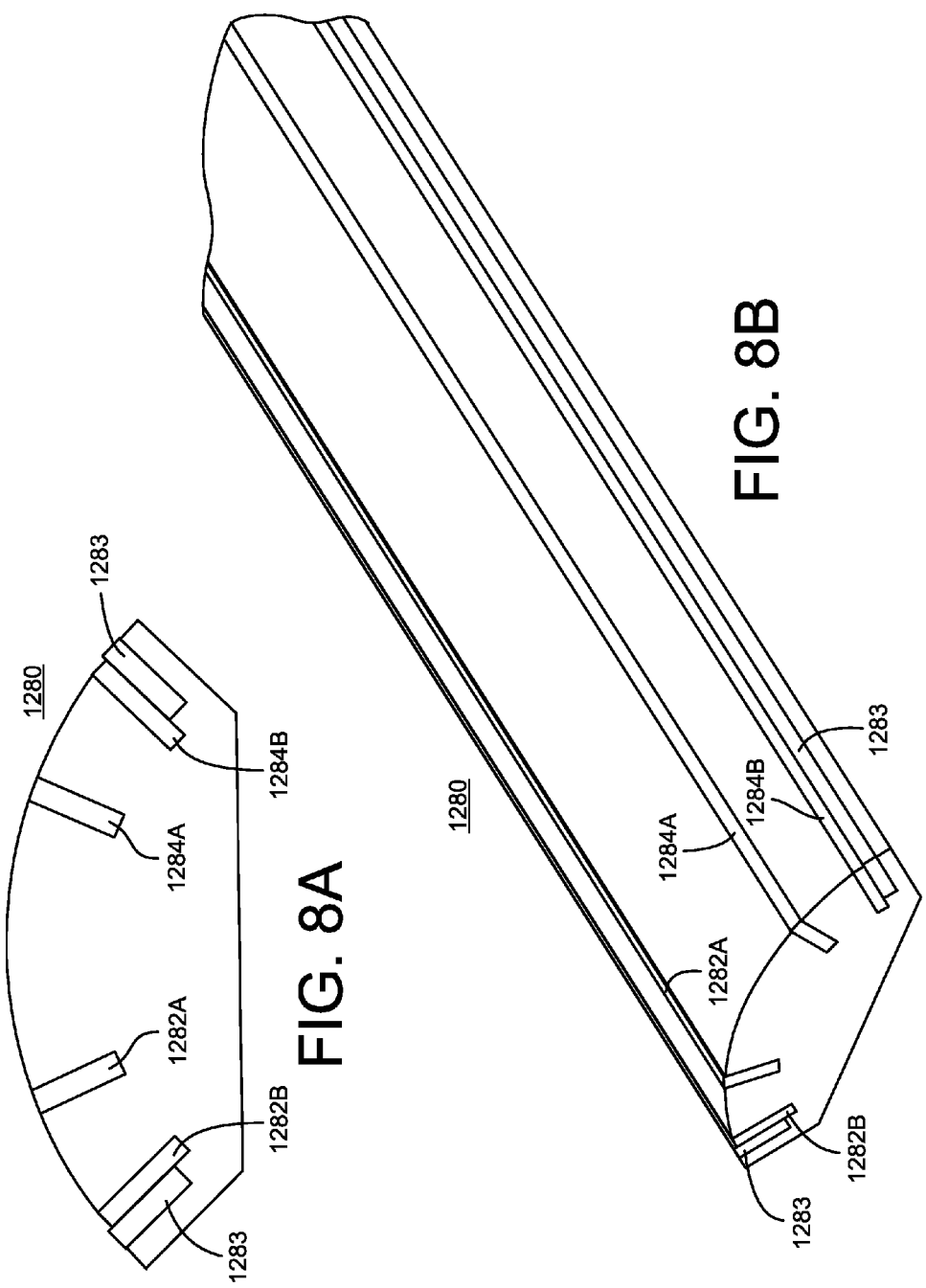

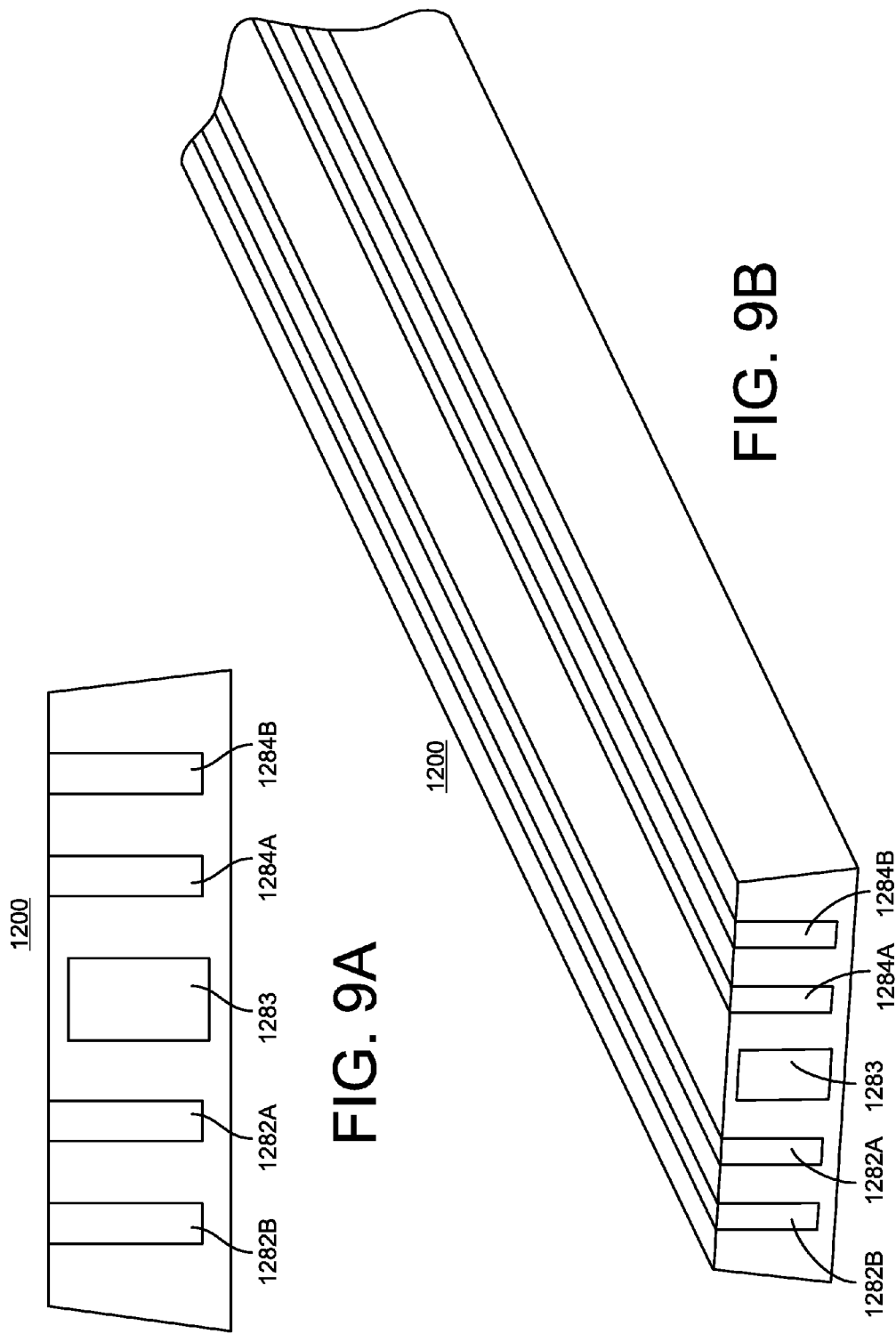

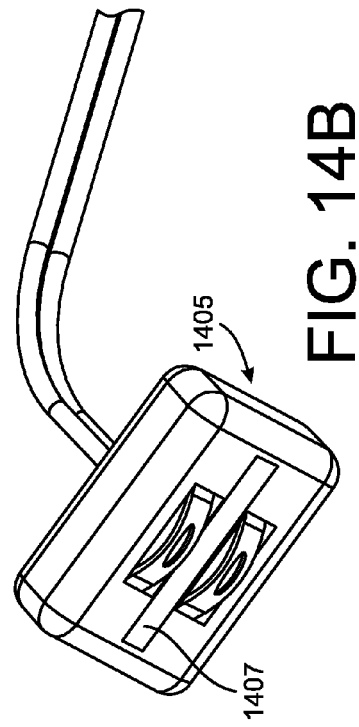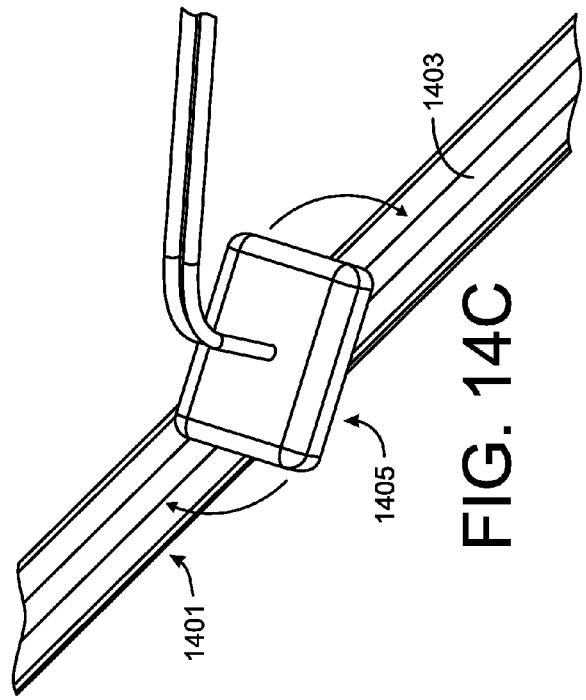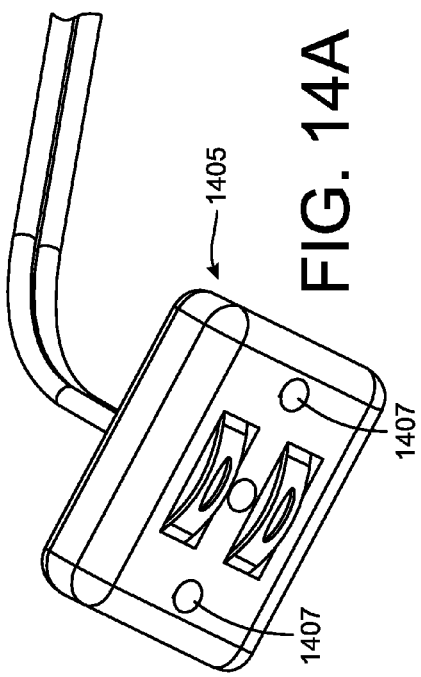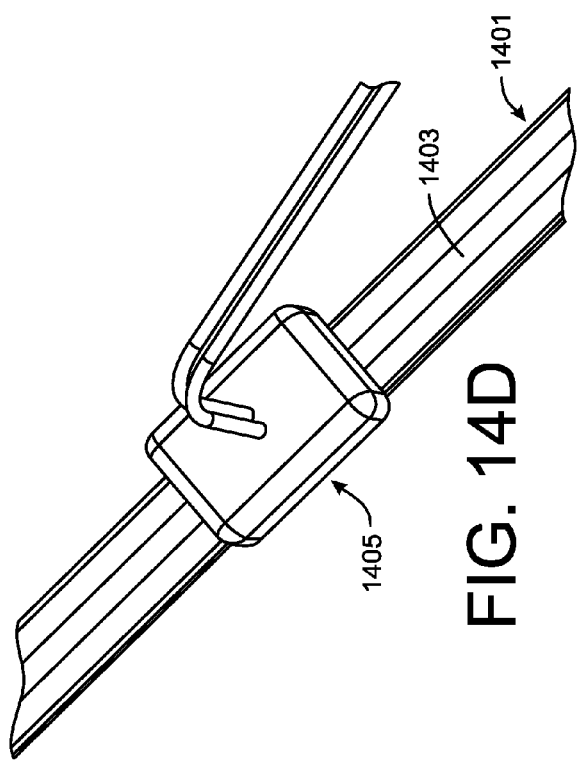

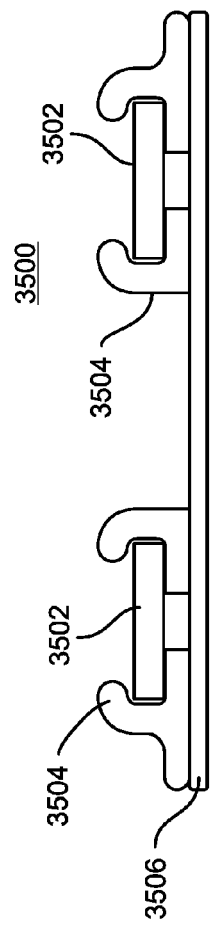
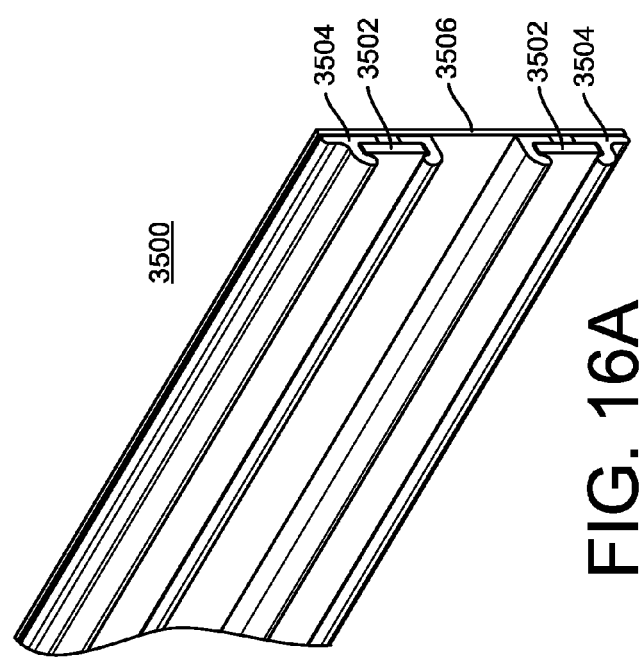

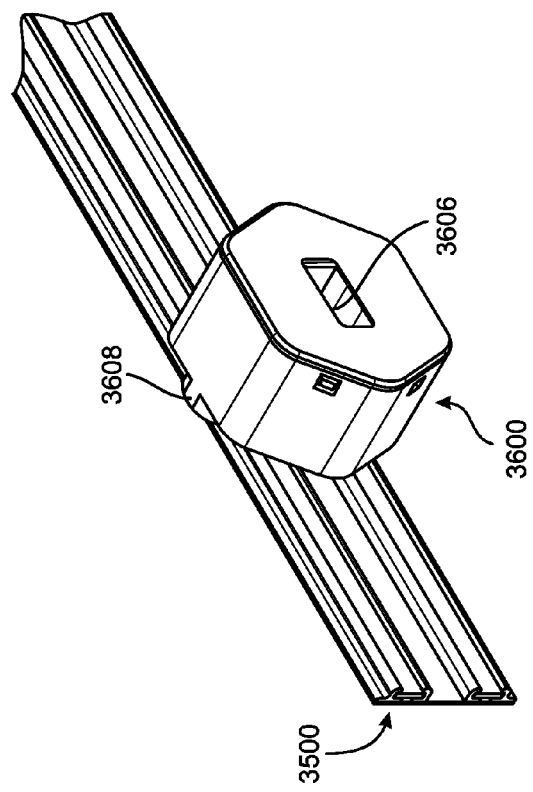
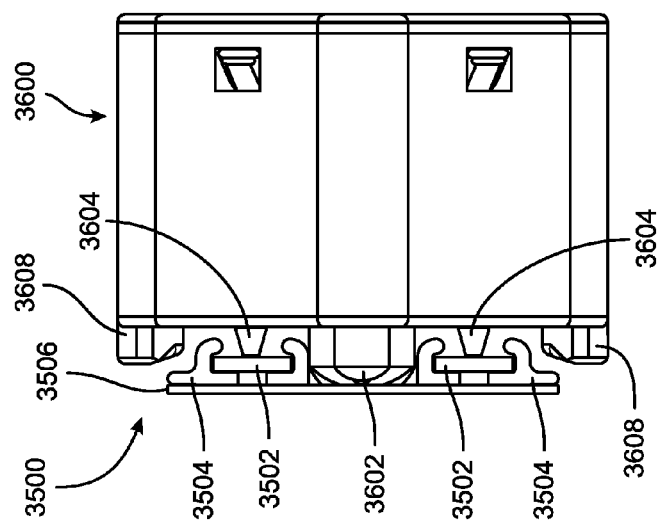

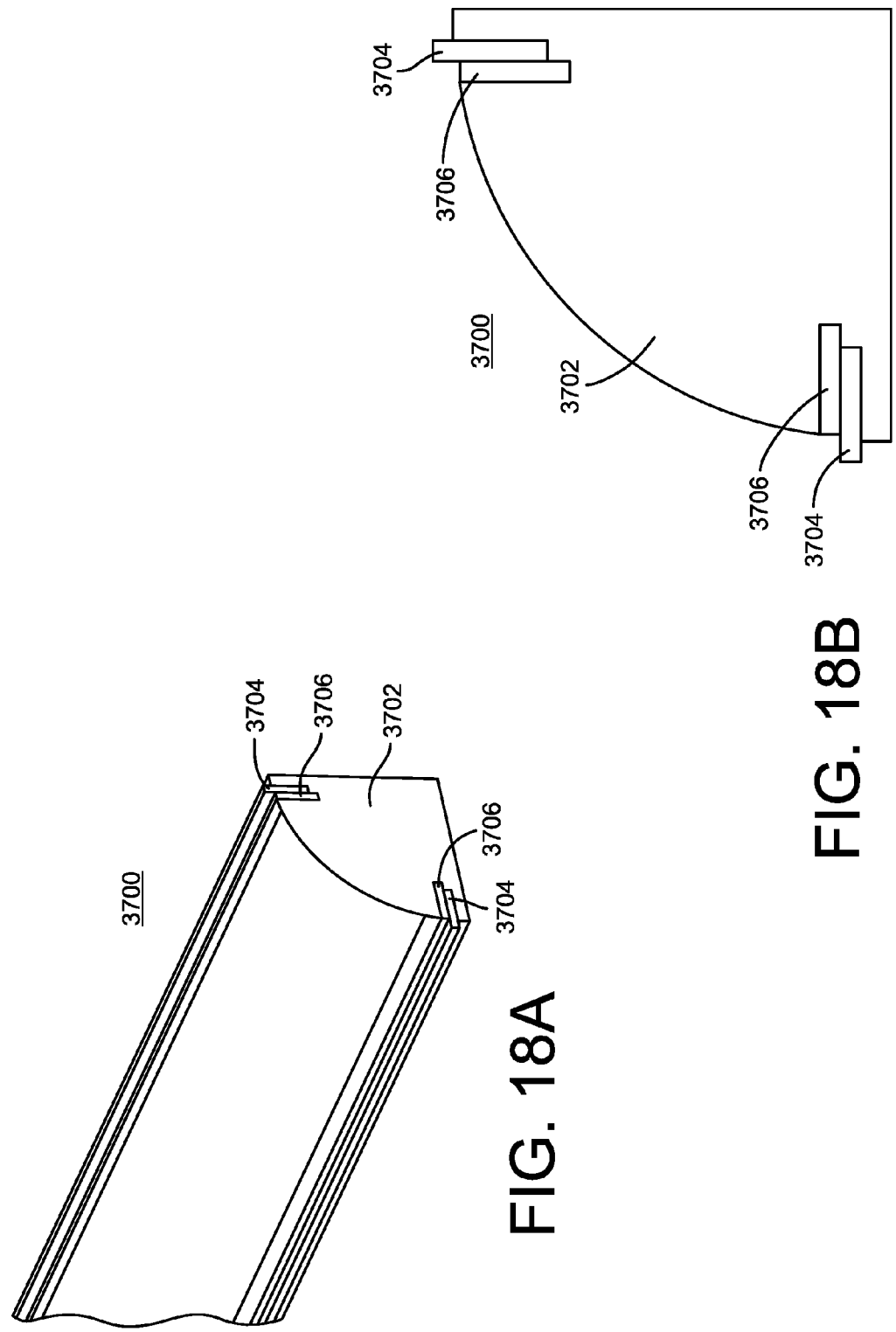

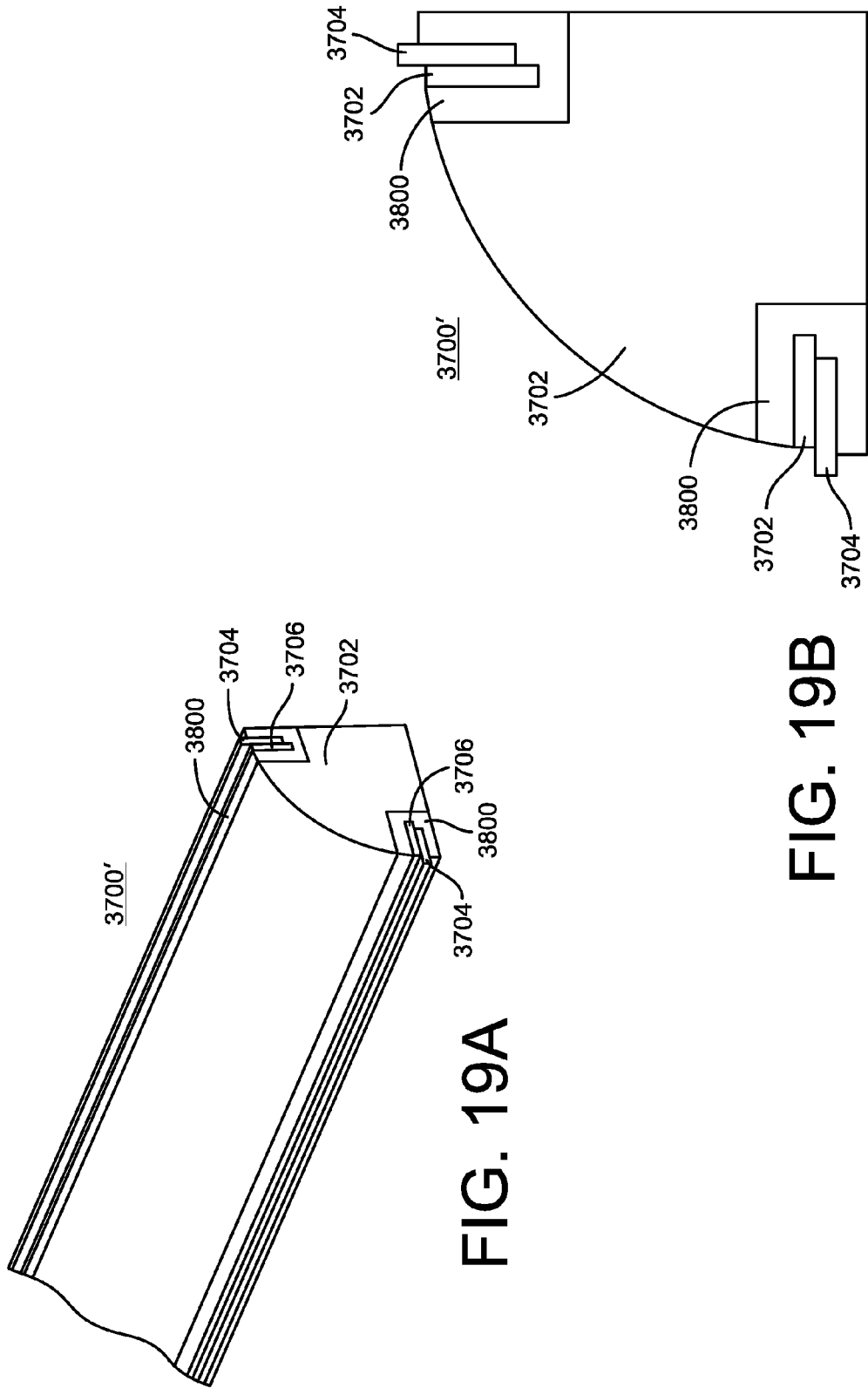

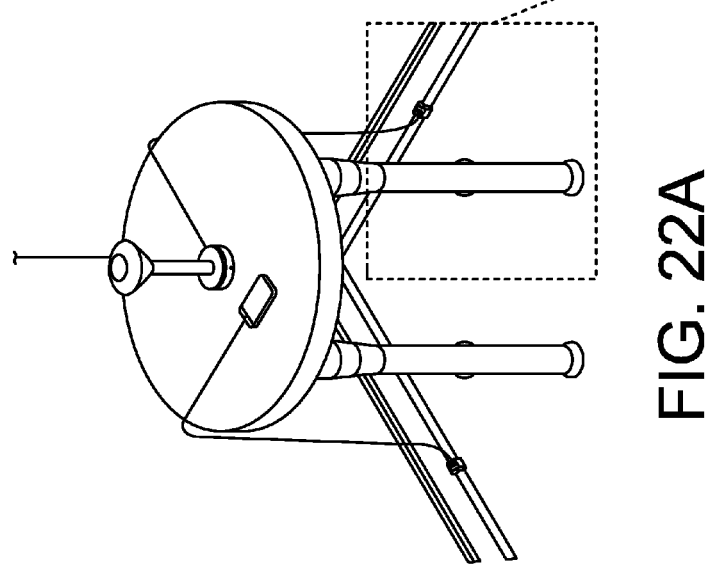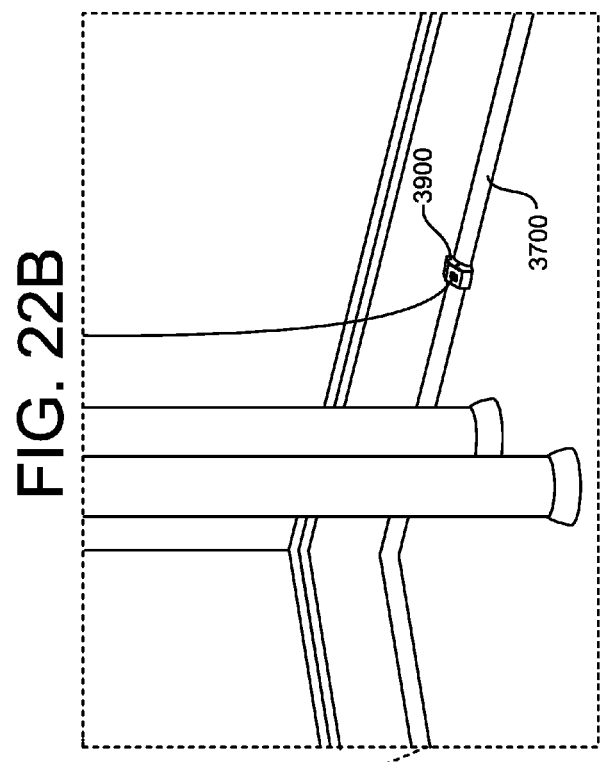

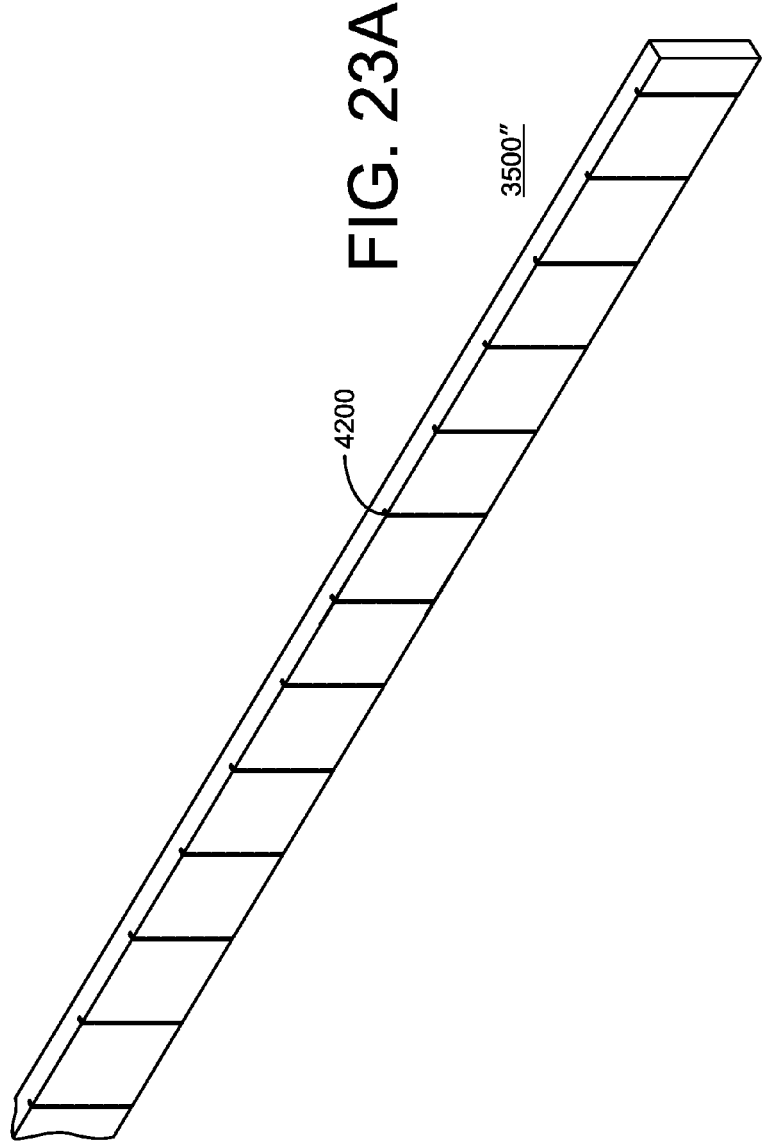
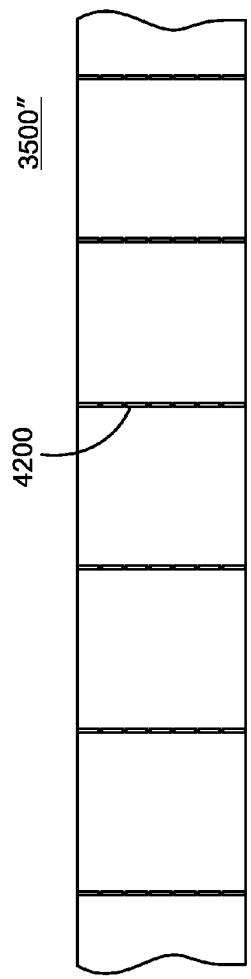

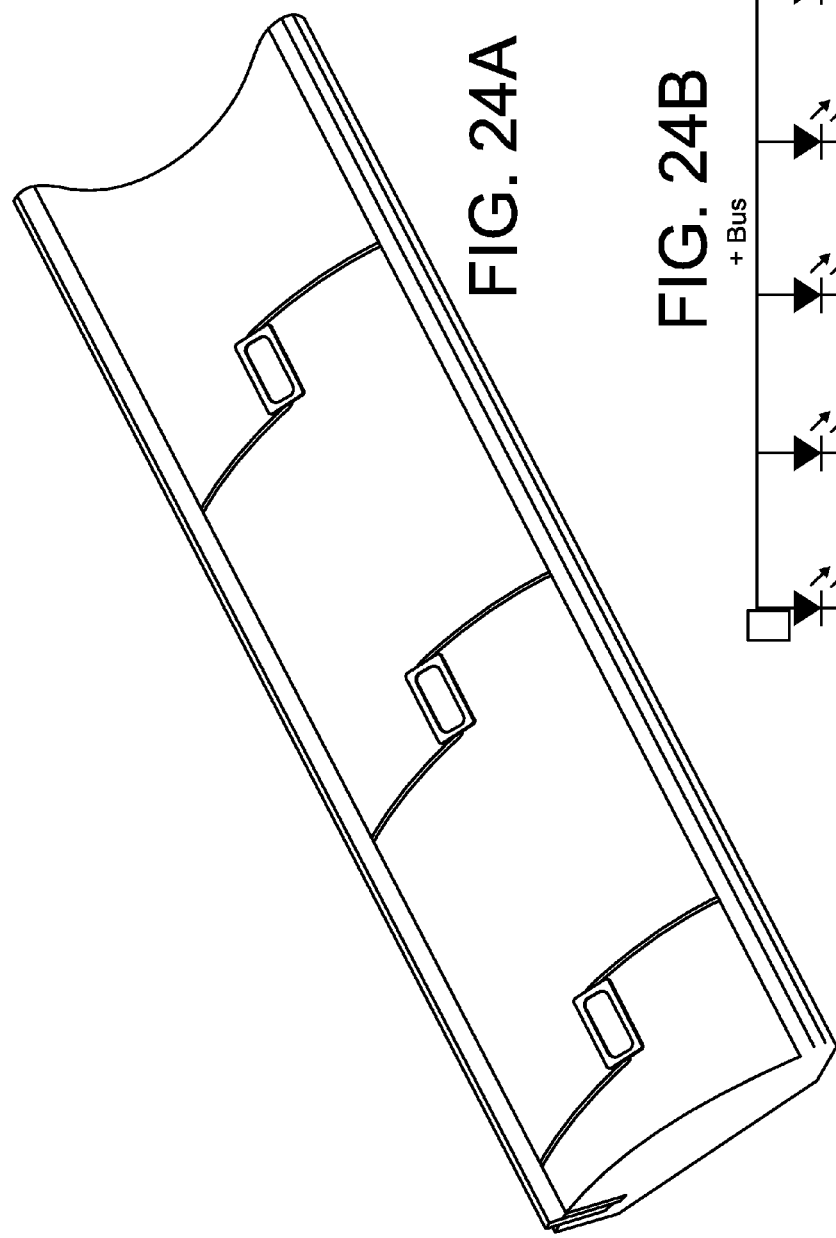
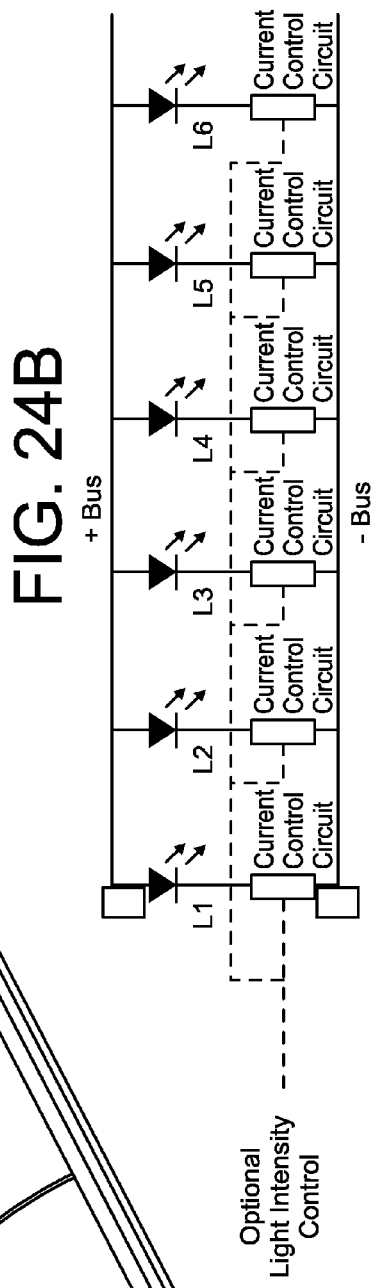
FIG. 24A
FIG. 24B

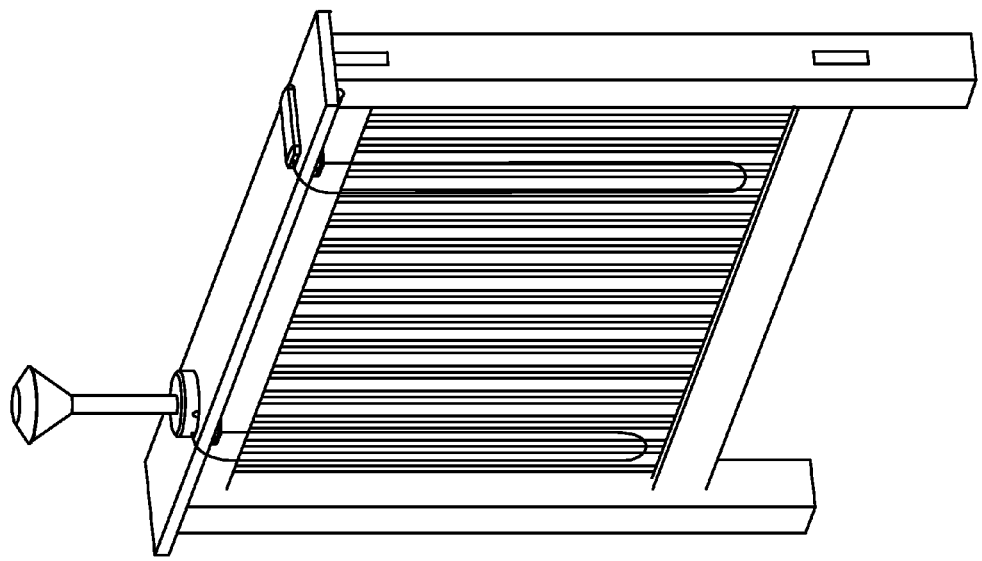
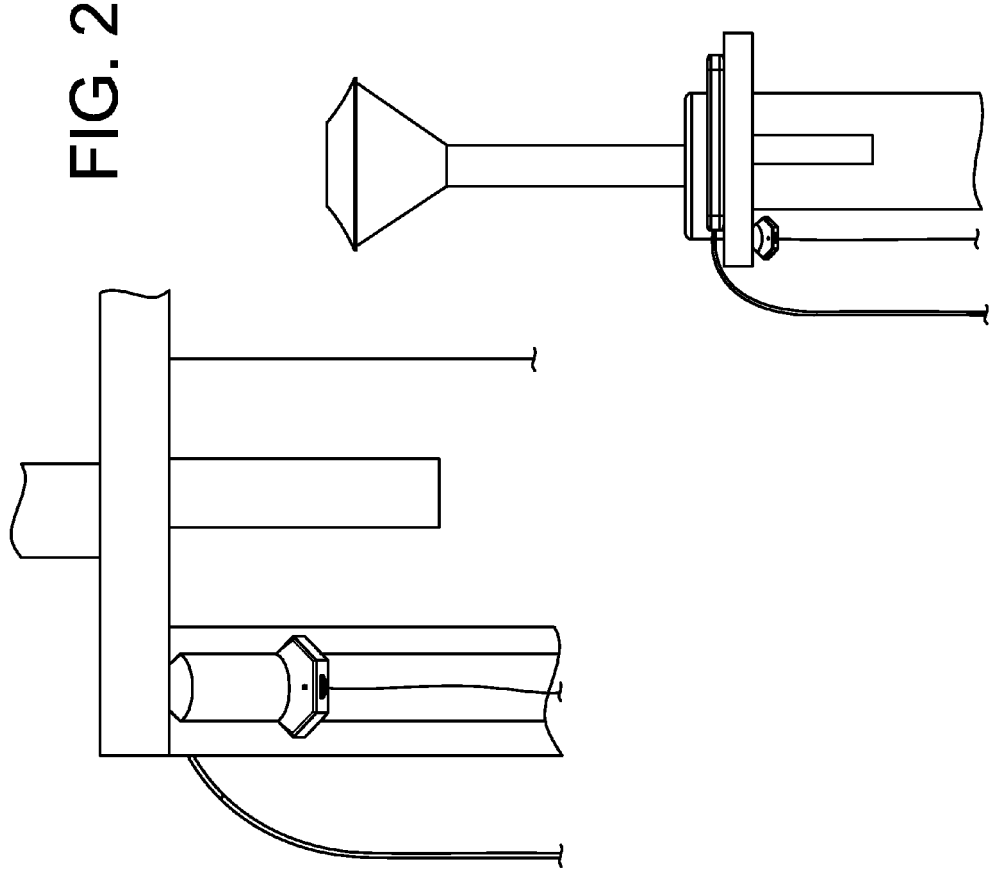
FIG. 26

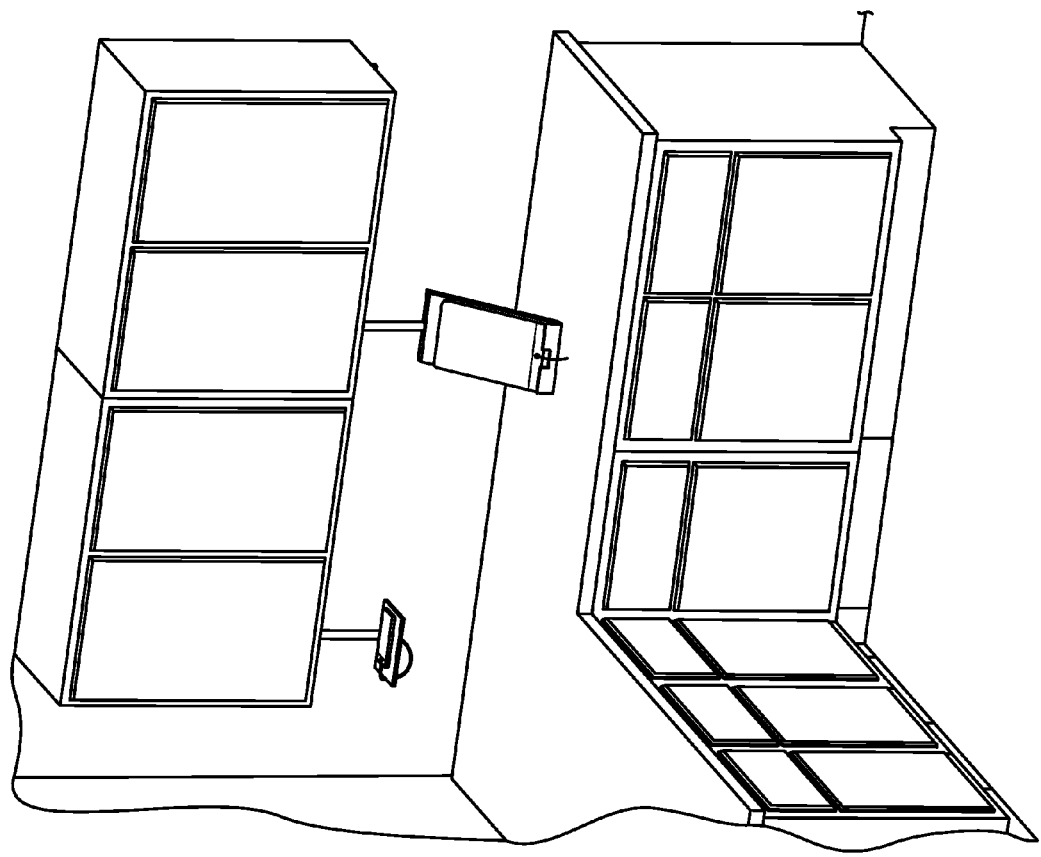

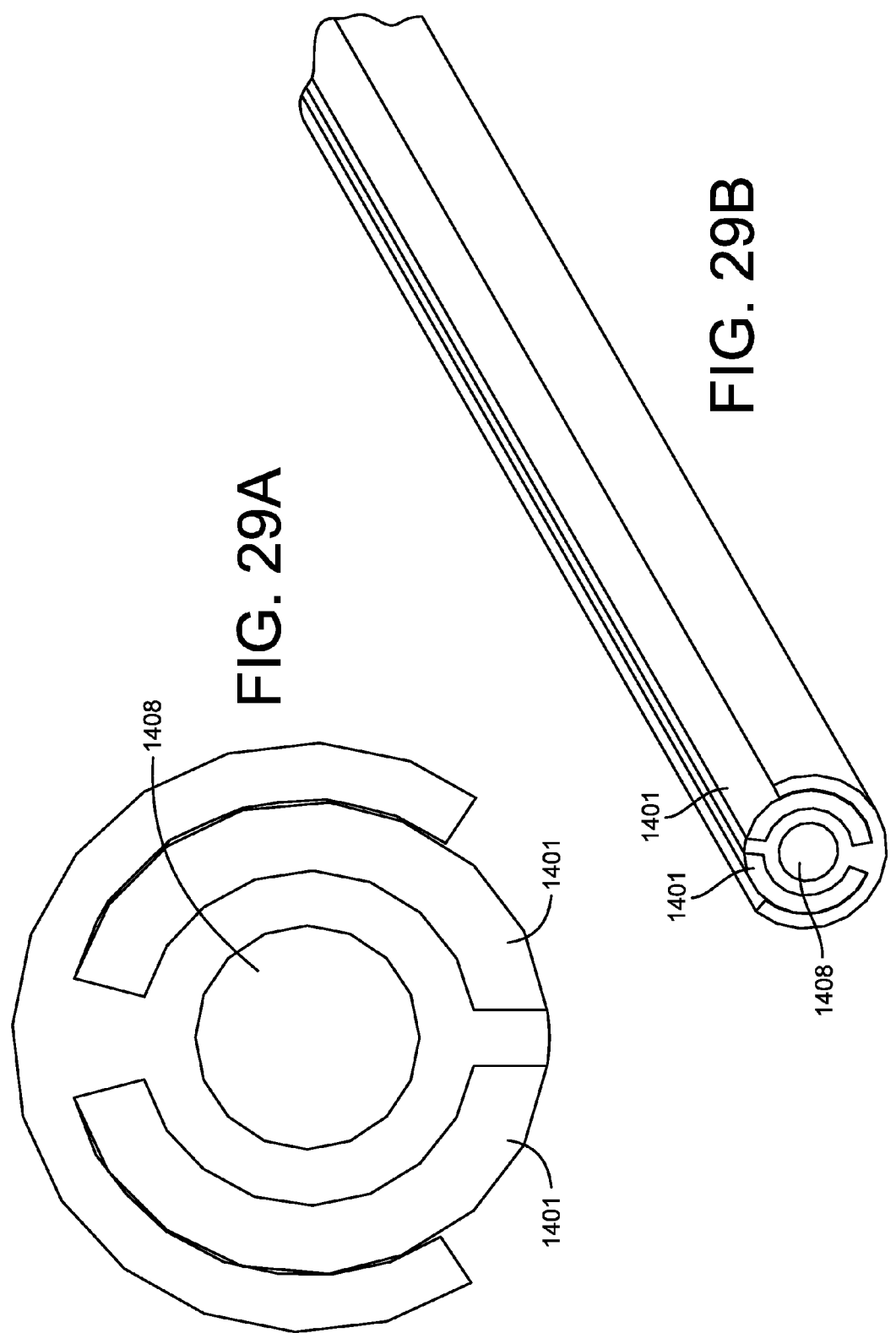

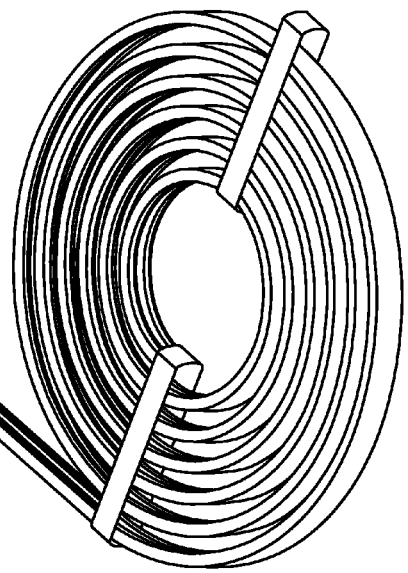
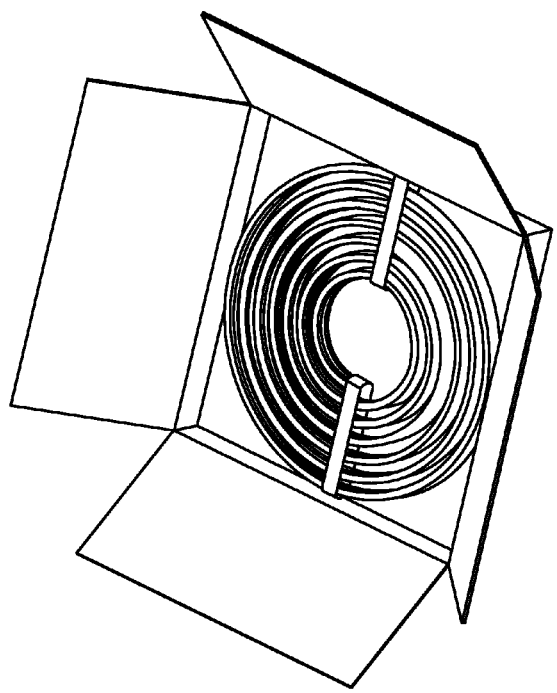

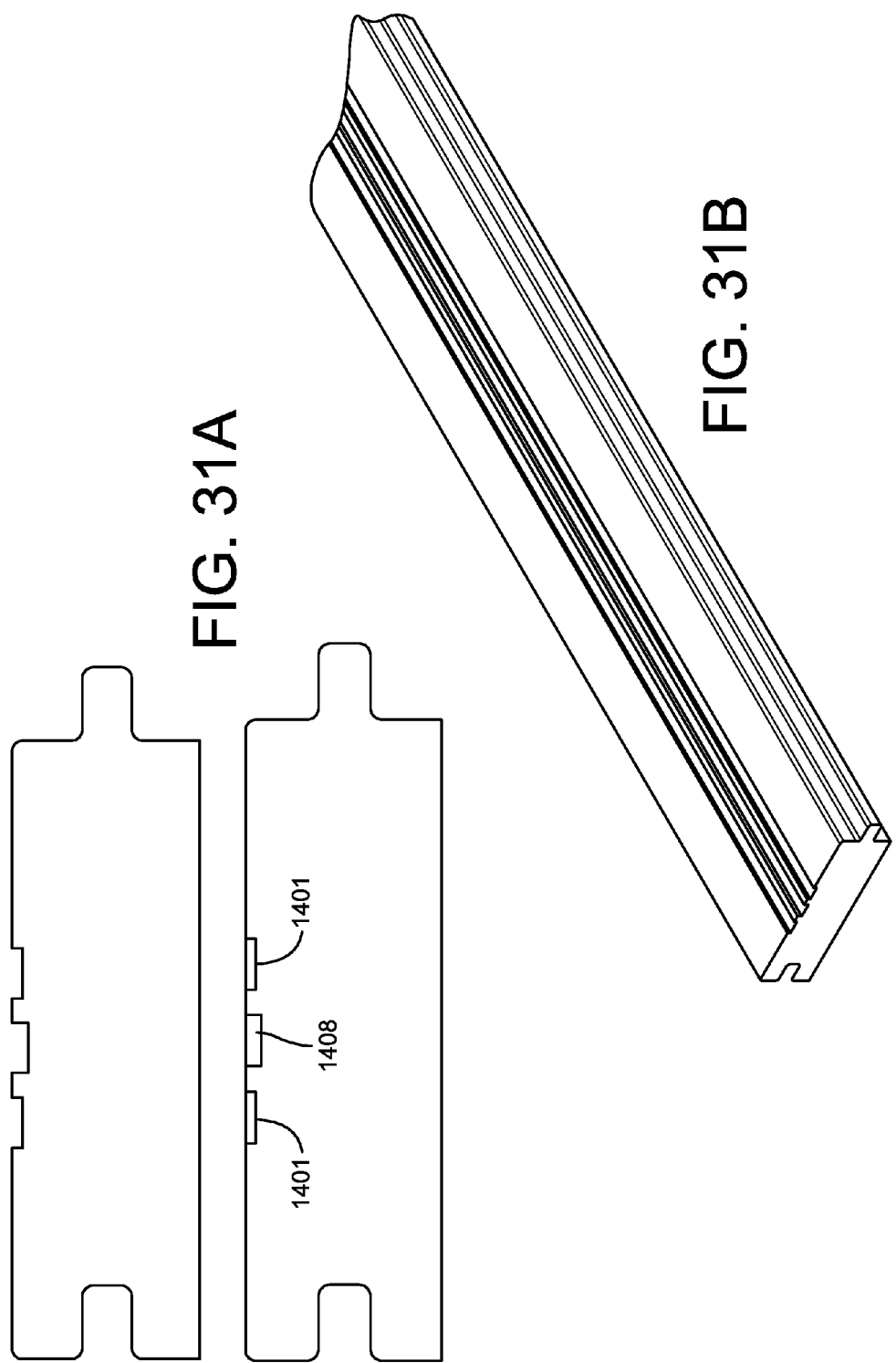

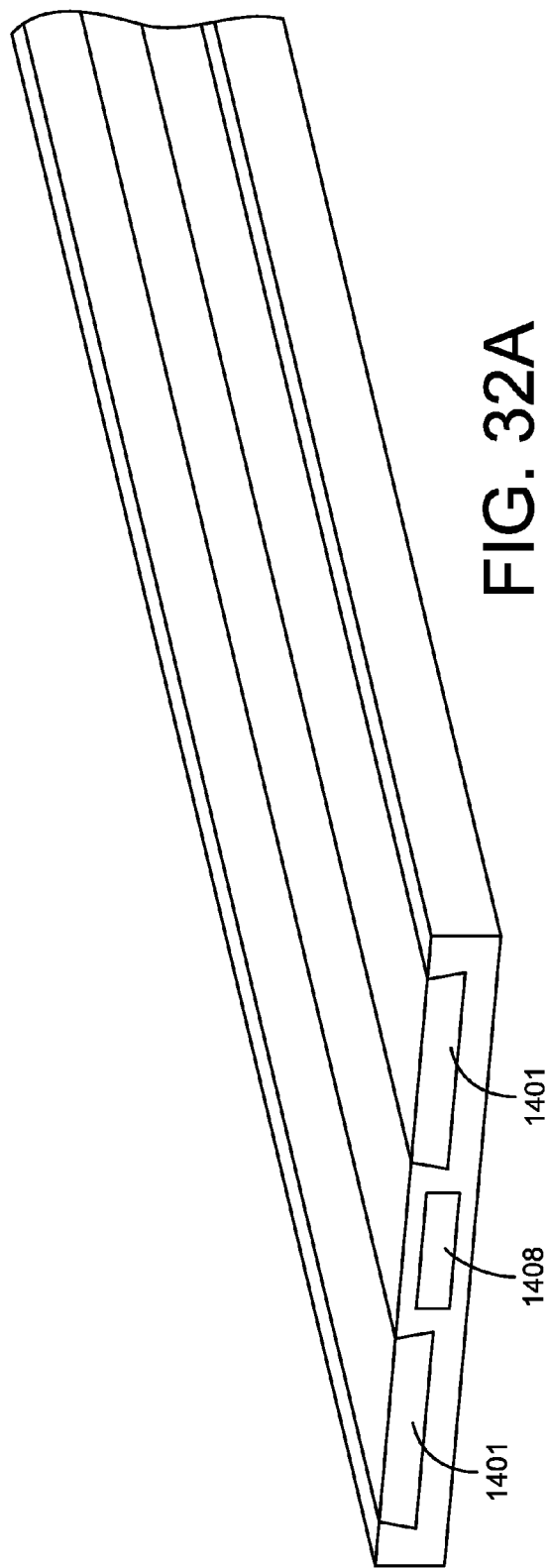
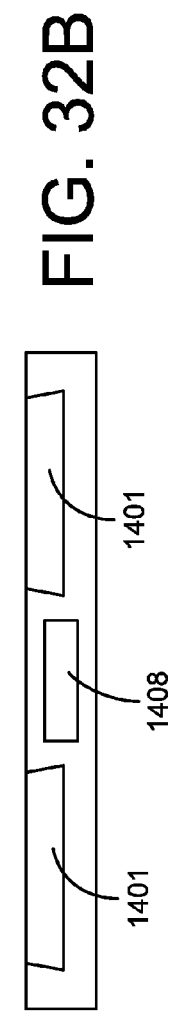
FIG. 32A
FIG. 32B

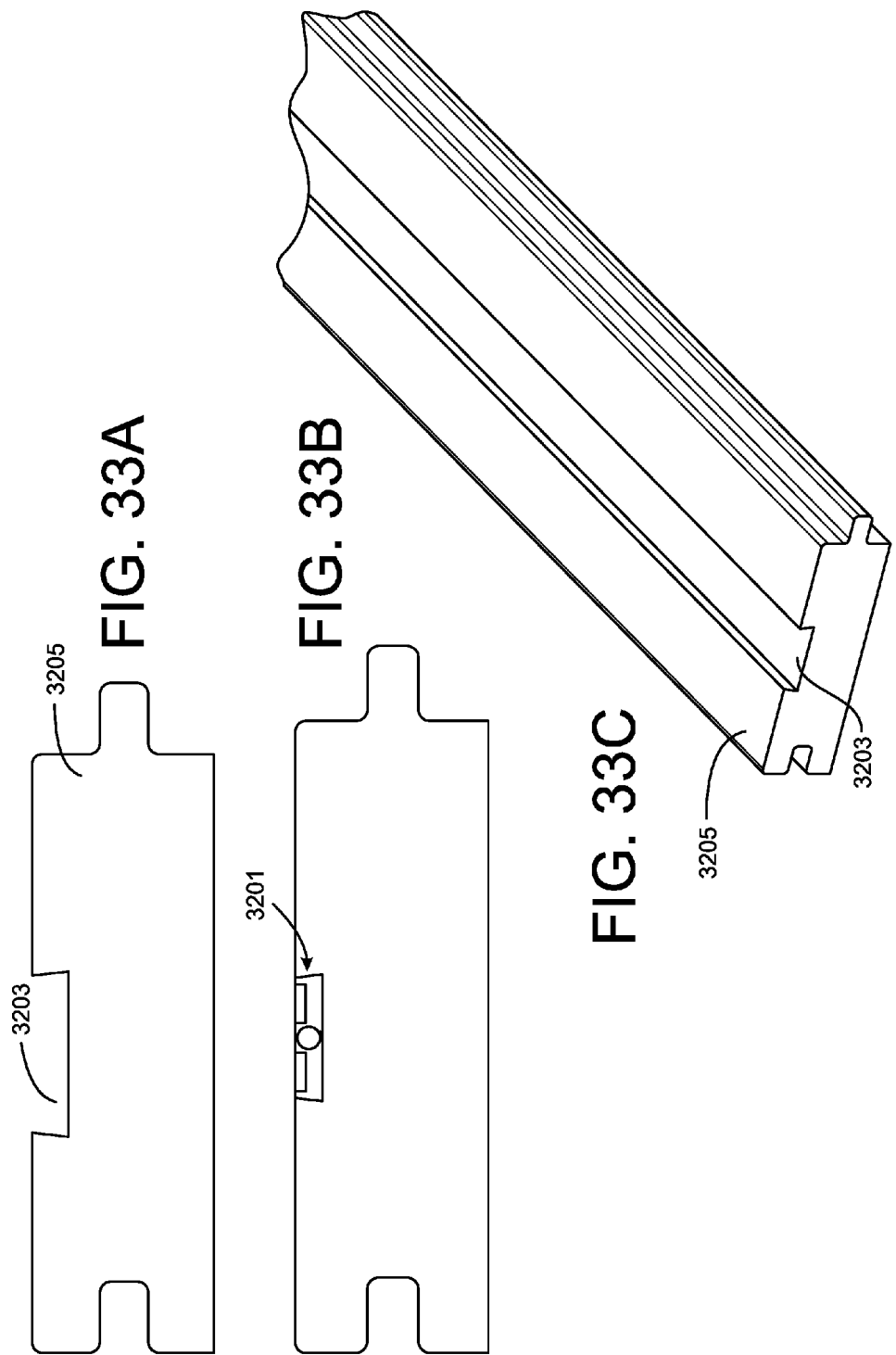

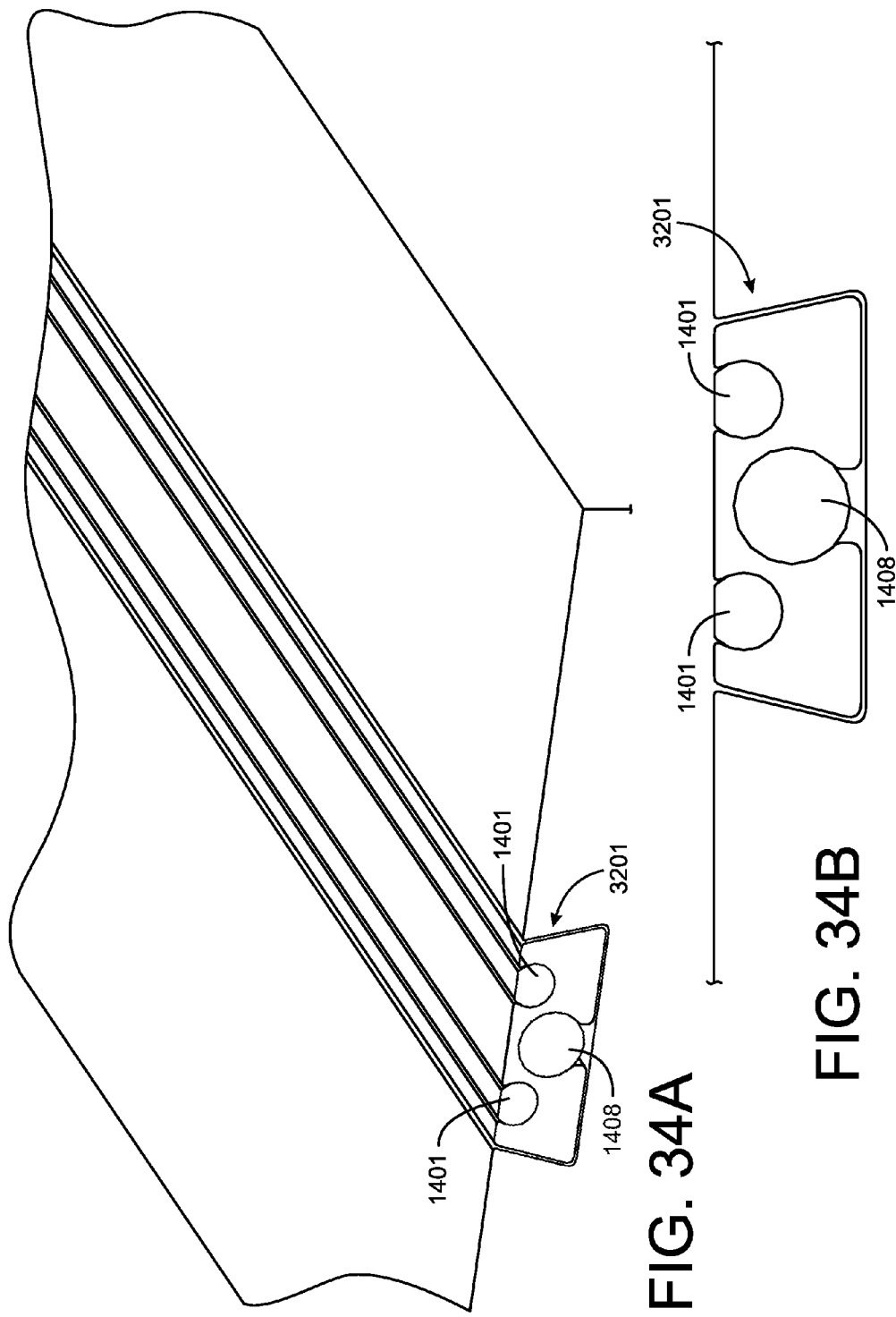

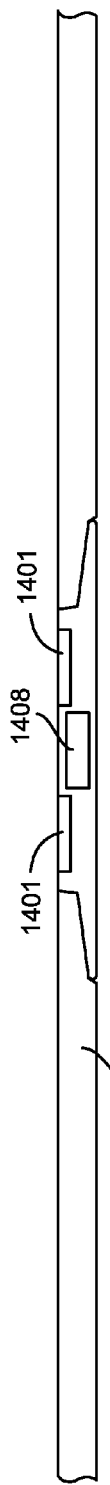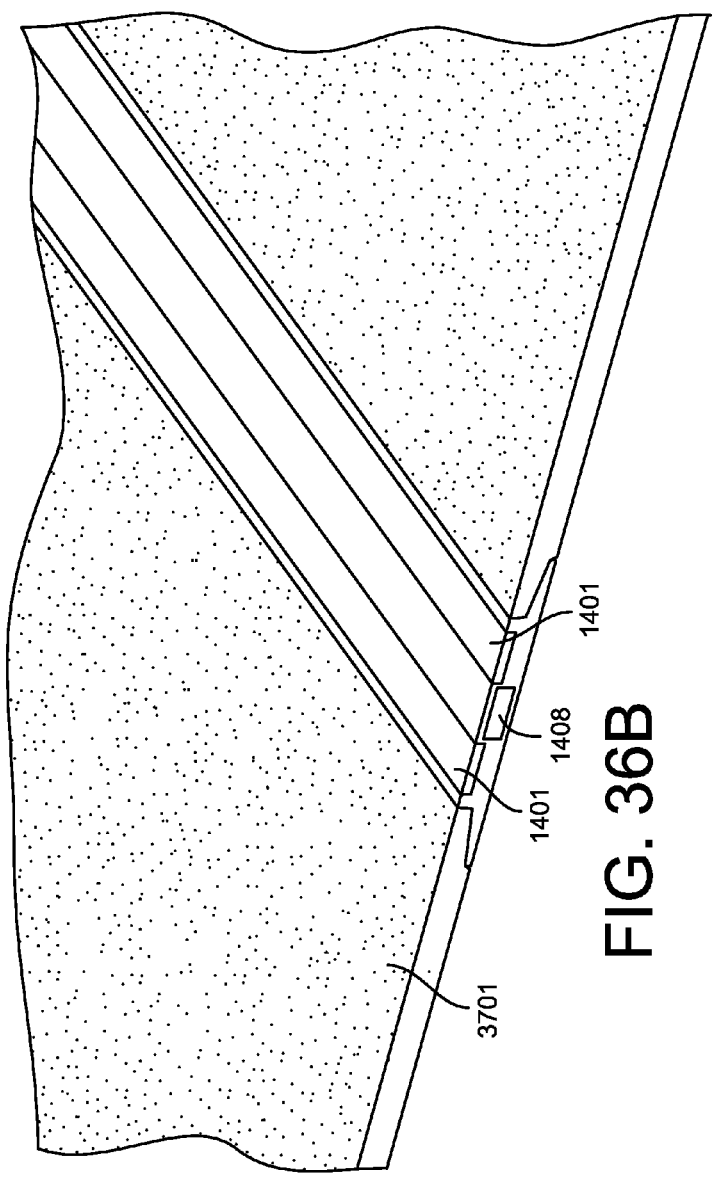

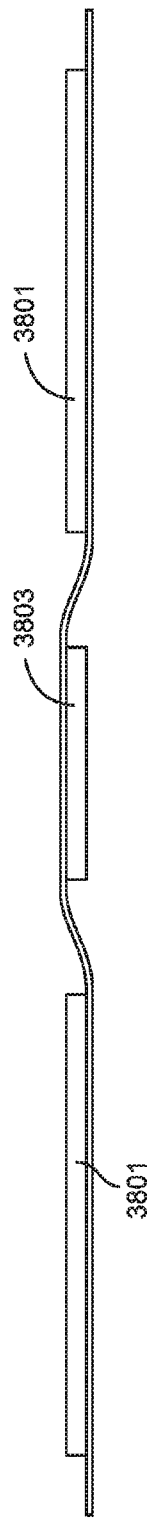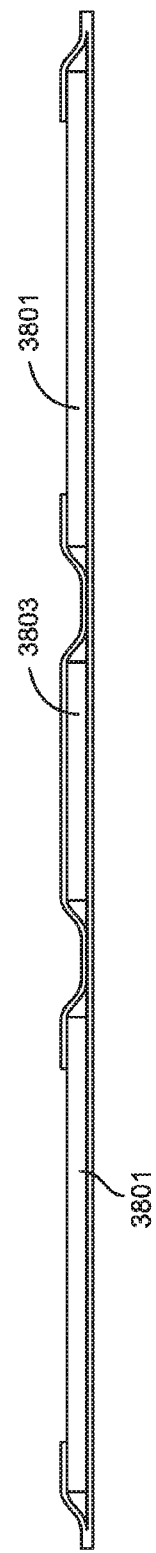

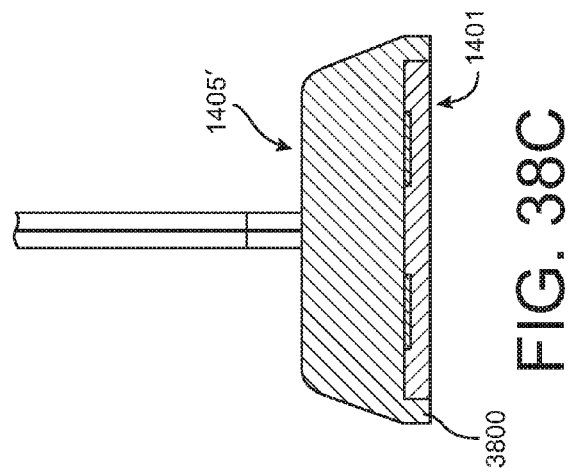
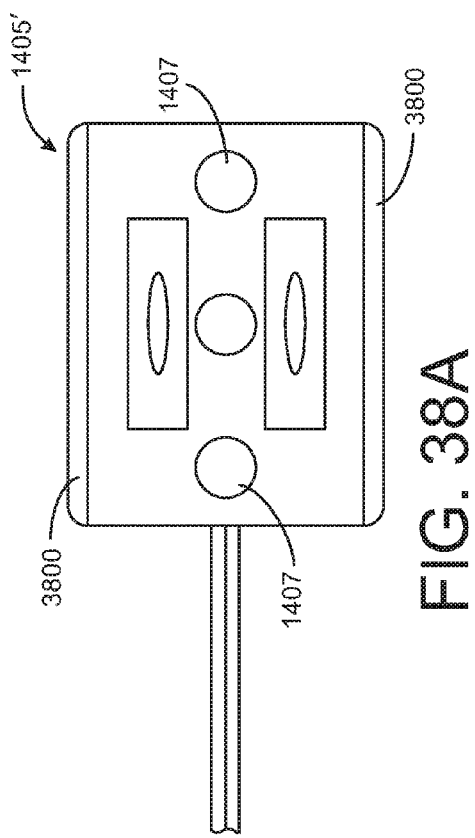
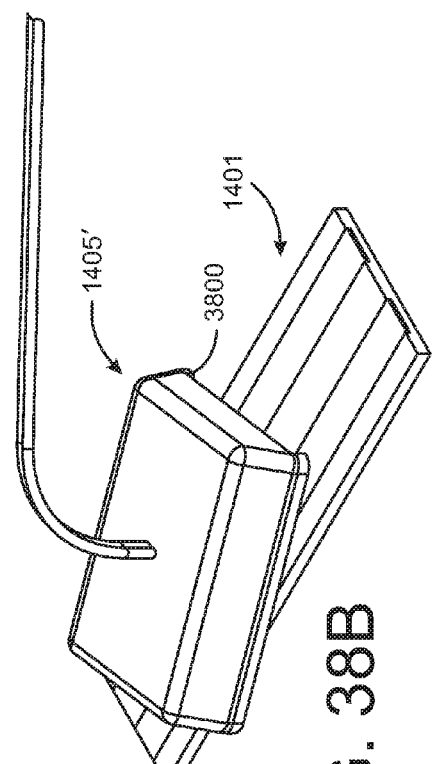

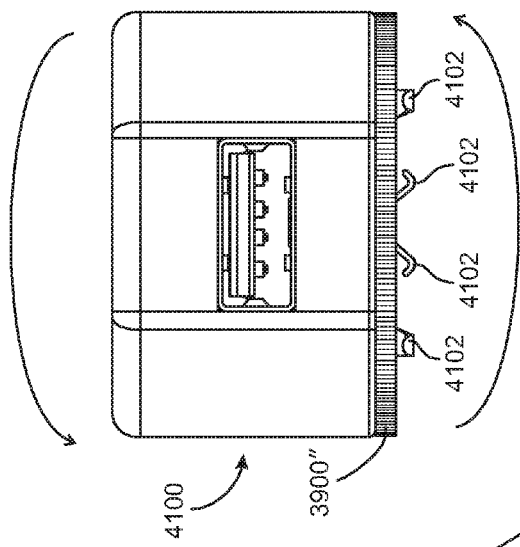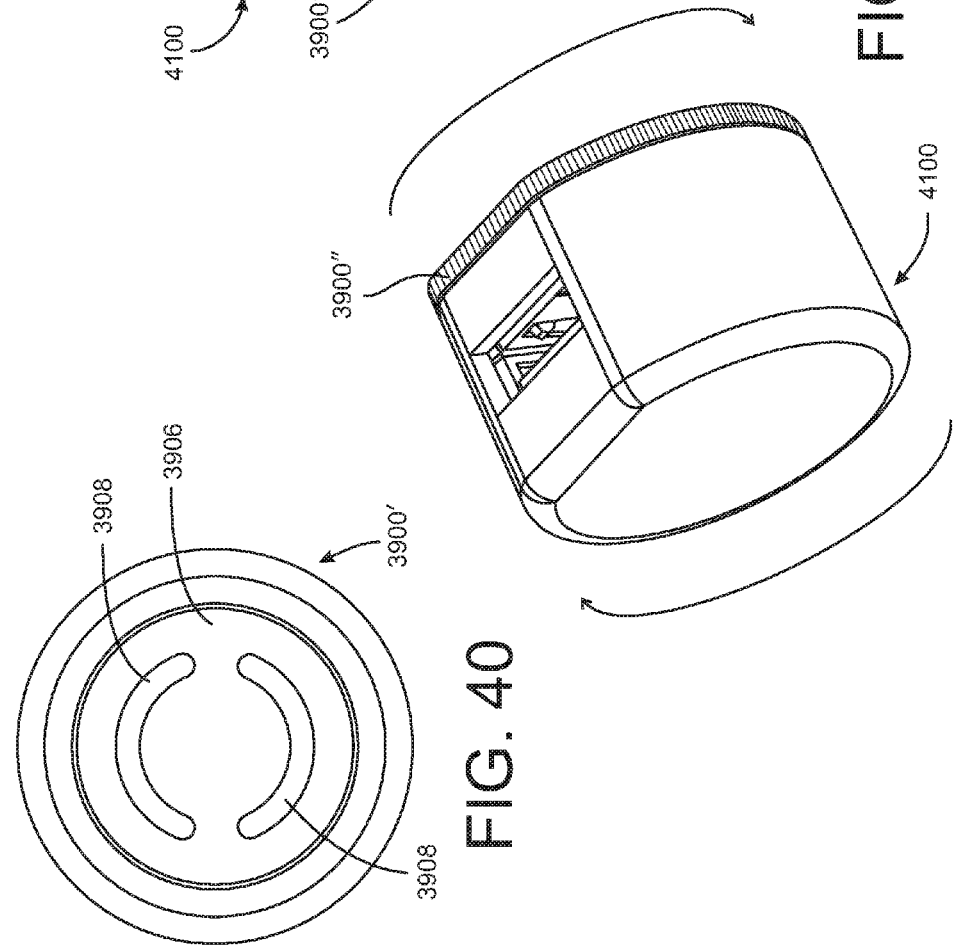

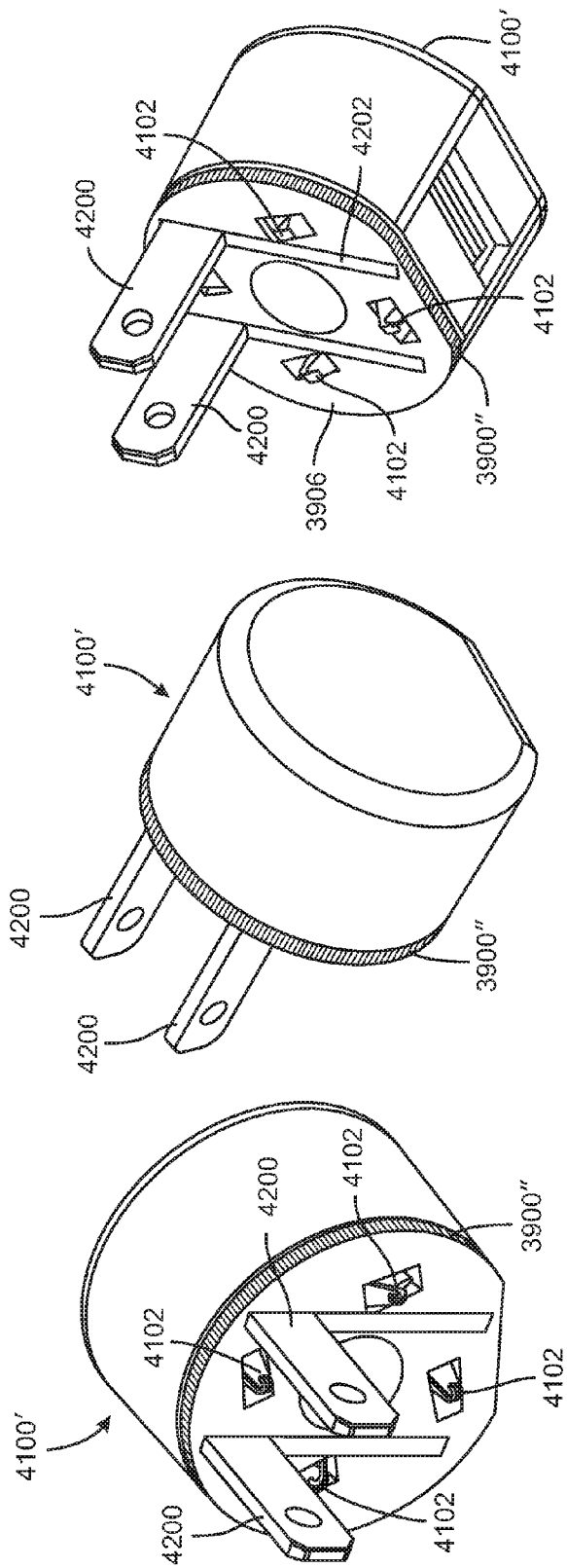

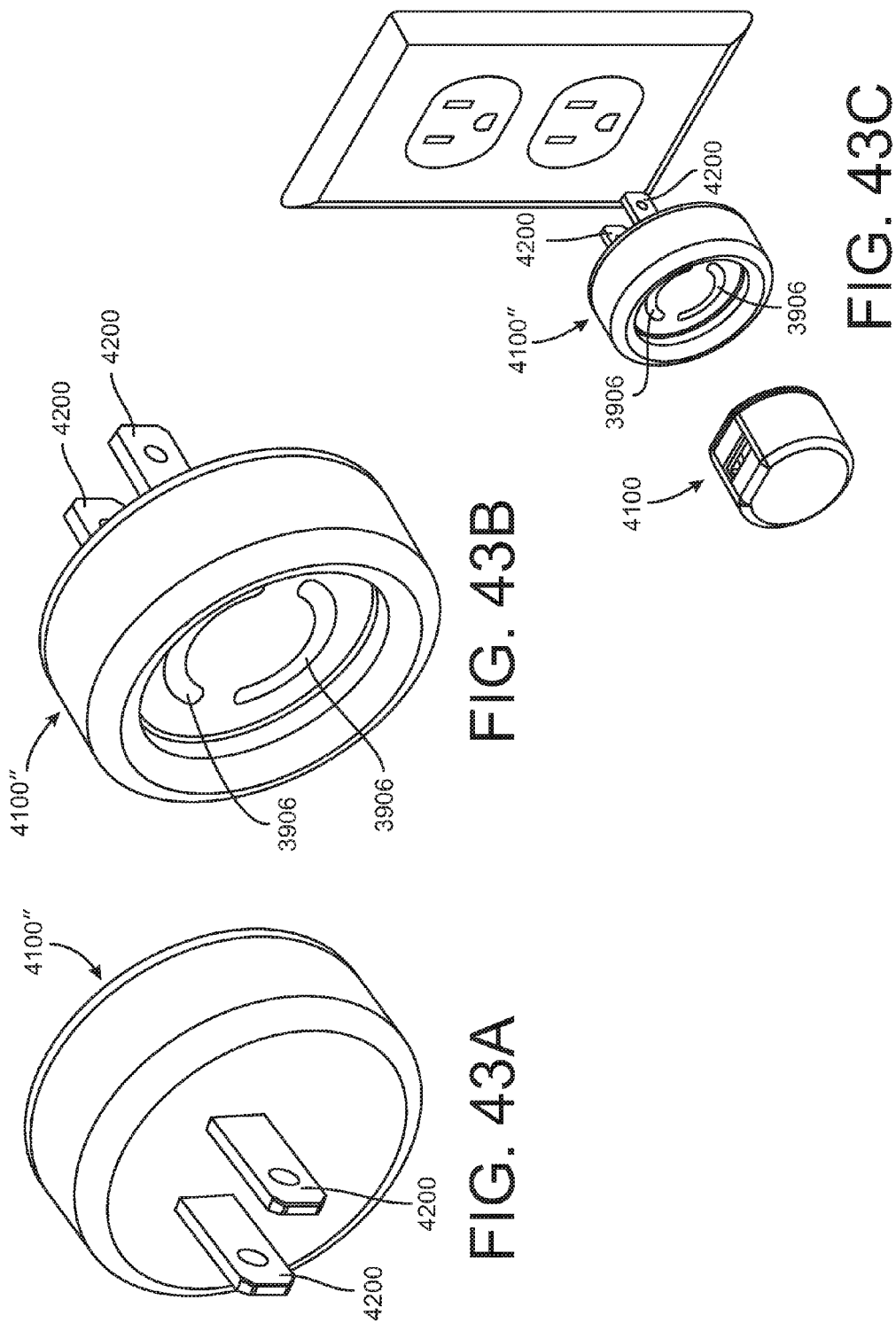

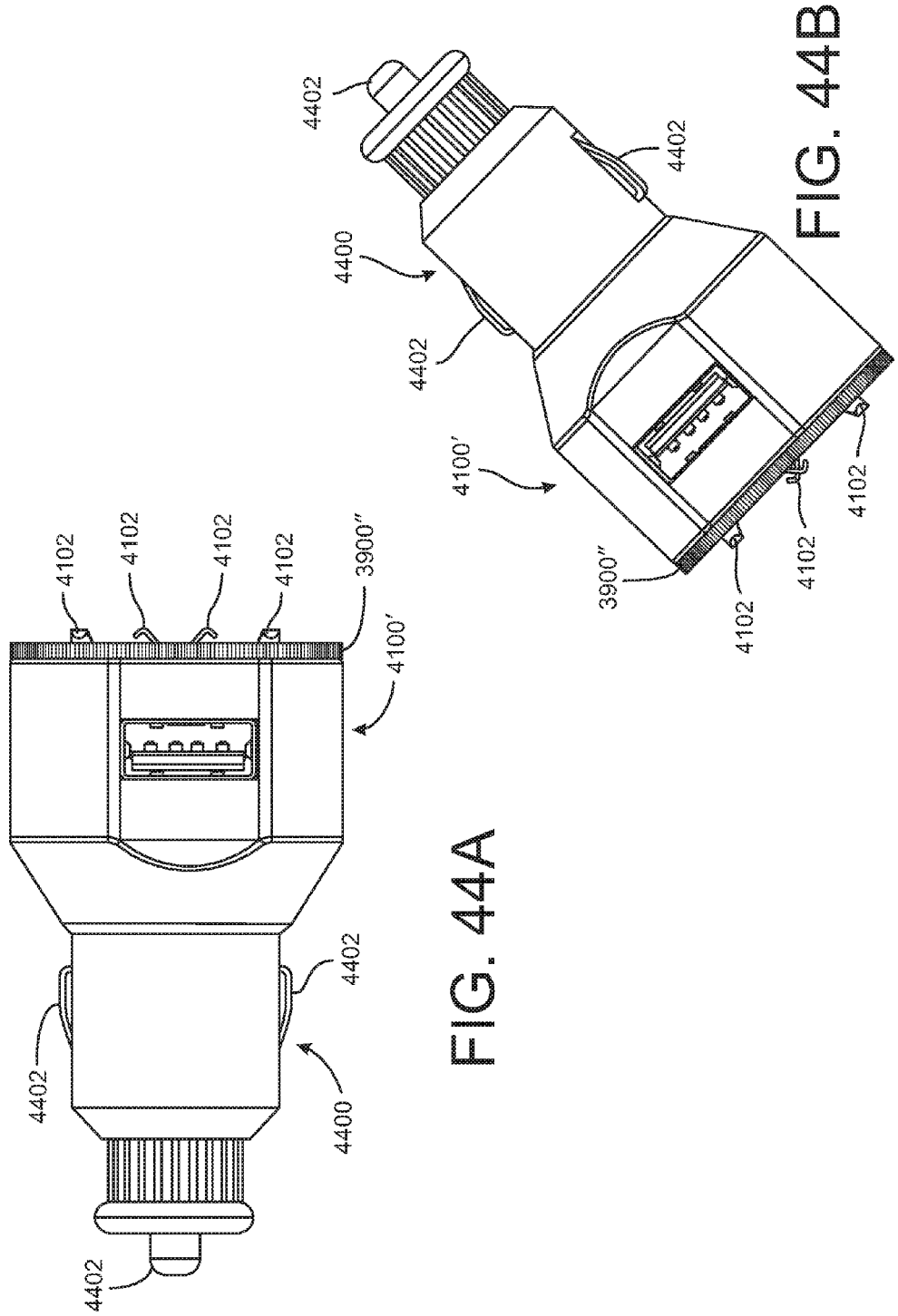

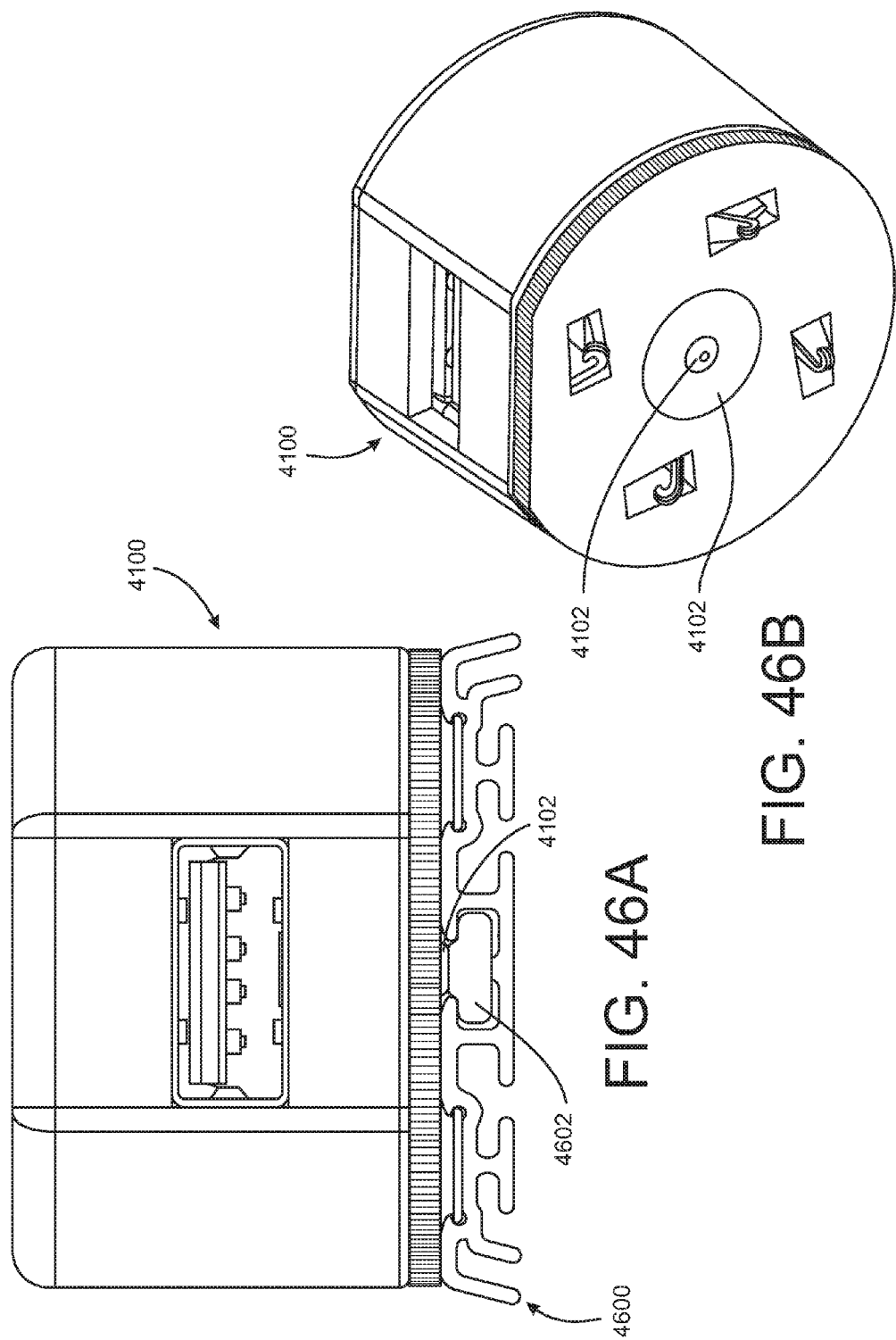

LOW VOLTAGE BUSS SYSTEM

RELATED APPLICATION INFORMATION

This application claims the benefit of and is a continuation-in-part of U.S. application Ser. No. 14/857,918 filed on Sep. 18, 2015, which application, in turn, claims the benefit of and is a continuation of U.S. application Ser. No. 14/030,768, filed on Sep. 18, 2013, which application, in turn, claims the benefit of U.S. Provisional Application No. 61/725,795, filed on Nov. 13, 2012, U.S. Provisional Application No. 61/768,907, filed on Feb. 25, 2103, U.S. Provisional Application No. 61/744,777, filed on Oct. 3, 2012, and U.S. Provisional Application No. 61/744,779, filed on Oct. 3, 2012, the disclosures of which are incorporated herein by reference in their entirety.

BACKGROUND

America's power plants deliver electrical power for residential, commercial, and industrial use almost exclusively via high voltage alternating current (AC). However, an increasing percentage of devices found in residences, businesses, and factories operate on low voltage direct current (DC) electrical power. For example, nearly all products that utilize rechargeable batteries, e.g., laptops, cellular telephones, smart phones, personal audio devices, and the like, require low voltage DC for power management and/or recharging of the device.

For converting the AC voltage exiting typical electrical outlets to the DC voltage needed to power such devices, a transformer "brick" is often required. Systems that use such transformer "bricks" do, however, suffer disadvantages. For example, the needed transformer "bricks" waste space and typically clutter an area that is centered on the AC outlet and/or the AC outlet is often not in a convenient location for recharging these electronic devices.

Furthermore, while there are many known bus systems that do take advantage of low voltage DC for use with LED lighting, these systems are not optimized to deliver power to a wide variety of devices including electronic devices that rely on connectors such as USB.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The present disclosure addresses at least some of the problems above-noted with respect to distributing DC power or signals. To this end, described is an improved system that is able to distribute power, e.g., low voltage DC power or communication signals, into a given space, e.g., home, office, vehicle, or the like, via use of a buss and a corresponding connector. In described embodiments, the buss comprises at least one electrical conductor that is coupled to a carrier which carrier can be affixed to a desired surface in a given space, e.g., home, work, or the like. In this regard, the buss may be affixed to a surface in any number of ways, including, for example, adhesive, hook-and-loop fastener, magnets, mechanical undercut, screws, and the like. In some described embodiments, the carrier may take the form of a strip or coil of material while in other described embodiments the carrier may take the form of an otherwise conventional piece of building material, such as a piece of molding, a railing, floor board, or the like. Regardless of the form of the carrier, the connector is preferably sized and arranged to couple to the buss and will include electrical components and features, e.g., USB ports, as needed for use in distributing the low voltage DC power from the buss to a device that is intended to receive power. By way of non-limiting examples, the connector may be permanently connected to the buss (or formed integral therewith) or may be releasably and easily connected to the buss via use of magnetism, via use of mechanical structures, or the like. It is also contemplated that it may be desirable to provide the connector with the ability to be moved, e.g., slid, relative to the buss when attached thereto to allow for placement of the connector at a desired location within a given space.

While the foregoing provides a general description of the subject buss system, a better understanding of the objects, advantages, features, properties, and relationships of the subject buss system will be obtained from the following detailed description and accompanying drawings which set forth illustrative embodiments and which are indicative of the various ways in which the principles of the invention claimed hereinafter may be employed.

BRIEF DESCRIPTION OF THE DRAWINGS

For a better understanding of the hereinafter described buss system reference may be had to the following drawings in which:

FIGS. 4A and 4B depict an example buss system in which the power supply is located in an input connector for the buss;

FIGS. 5A and 5B depict an example buss system in which the power supply connects directly to the buss and the building power supply at the same time;

FIGS. 6A-6C depict a power supply located within an electrical junction box enclosure within a wall cavity and an exemplary buss for use therewith;

FIGS. 7A-7D depict a wall mountable input connector and an exemplary buss for use therewith adapted to receive power from a remote power supply such as shown in FIG. 12;

FIGS. 8A and 8B depict an example buss comprised of two sets of electrical or signal buss pairs mounted to an exemplary carrier which busses could be individually powered by separate channels of a power supply such as shown in FIG. 12;

FIGS. 9A and 9B depict an example buss comprised of two sets of electrical or signal buss pairs mounted within a carrier and providing a flush interface, which could be powered by a splitter input connector such as shown in FIG. 1;

FIGS. 14A-14D depict a buss system which uses magnetism to assure correct orientation between a connector and the buss;

FIGS. 16A-16B depict a further exemplary buss;

FIGS. 17A and 17B depict an exemplary connector connected to the buss of FIGS. 16A and 16B;

FIGS. 18A, 18B, 19A, and 19B depict further examples of a buss having a carrier in the form of a building element;

FIGS. 22A and 22B depict an example use case of a buss system in a home environment;

FIGS. 23A and 23B depict an example buss adapted to be easily shortened;

FIGS. 24A, 24B, 25A and 25B depict further example busses with integrated LED lighting with their corresponding electrical diagrams;

FIG. 26 depicts an example use cases of a buss system in a deck environment;

FIGS. 27 and 28 depict example use cases of a buss system in a kitchen environment;

FIGS. 29A and 29B depict an example buss embodied in a circular carrier having a ferromagnetic core;

FIGS. 30A and 30B depict a buss that can be coiled in an elastic state;

FIGS. 31A and 30B depict a buss with a carrier in the form of a floor board;

FIGS. 32A and 32B depict a buss with a flush mating surface and a buss with conductors having an exemplary shape for maintaining the conductors within the carrier;

FIGS. 33A-33C depict a buss with a flush mating surface and a buss carrier having an exemplary shape for maintaining the buss carrier within a further carrier with the further carrier having the exemplary form of a floor board;

FIGS. 34A and 34B depict a buss with a flush mating surface and a buss carrier having an exemplary shape for maintaining the buss carrier within a further surface;

FIGS. 36A and 36B depict a buss with a flush mating surface and a buss carrier having undercuts for holding the buss carrier under carpeting or the like;

FIGS. 37A-37C depict a buss that uses a thin tape as the buss carrier;

FIGS. 38A-38C depict a connector having a keying feature;

FIG. 40 depicts a connector adaptor face for rotationally coupling a connector;

FIGS. 41A and 41B depict a connector couplable with the connector adaptor of FIG. 40 having an optional rotatable base;

FIGS. 42A-42C depict a connector adaptor having forks for coupling the connector adaptor to an AC power outlet;

FIGS. 43A-43C depict a further connector adaptor having forks for coupling the connector adaptor to an AC power outlet;

FIGS. 44A and 44B depict a further connector having a power plug;

FIGS. 46A and 46B depict a further connector and bus system; and

DETAILED DESCRIPTION

The following description of example methods and apparatus is not intended to limit the scope of the invention hereinafter claimed to the precise form or forms detailed herein. Instead, the following description is intended to be illustrative so that others may follow its teachings.

A conductive buss system is described for use in permitting electrical power and/or signals to be conducted and accessed at any point along a distance. As will become apparent from the description that follows, the described buss system allows low voltage DC power and/or signals to be introduced into space in a manner that eliminates clutter, e.g., eliminates the need to run wires or cables from plugs that are required to be attached directly to immovable and intermittently located electrical outlets, while allowing the space to be tailored for use on an individual basis as needed. As will also become apparent, the hereinafter described conductive buss and/or electrical buss may use any suitable electrically conductive element, such as a strip, bar, wire, etc., for conducting any suitable signal, including power, communications, etc. In other words, the described conductive buss is not limited to any particular conductive medium.

Generally, the described buss system includes a power source (or signal source) that provides low voltage DC (or other suitable signal) to a conductive buss (or multiple conductive busses). In some examples, a power source or supply may have multiple modes of operation, including, for example, a low power usage standby mode and a full power use mode. By having a power source (or supply) that can switch between two or more modes of operation, more efficient energy usage can be achieved. One of ordinary skill in the art will appreciate that a power source or supply may have other modes of operation beyond those disclosed herein.

Figure 1:
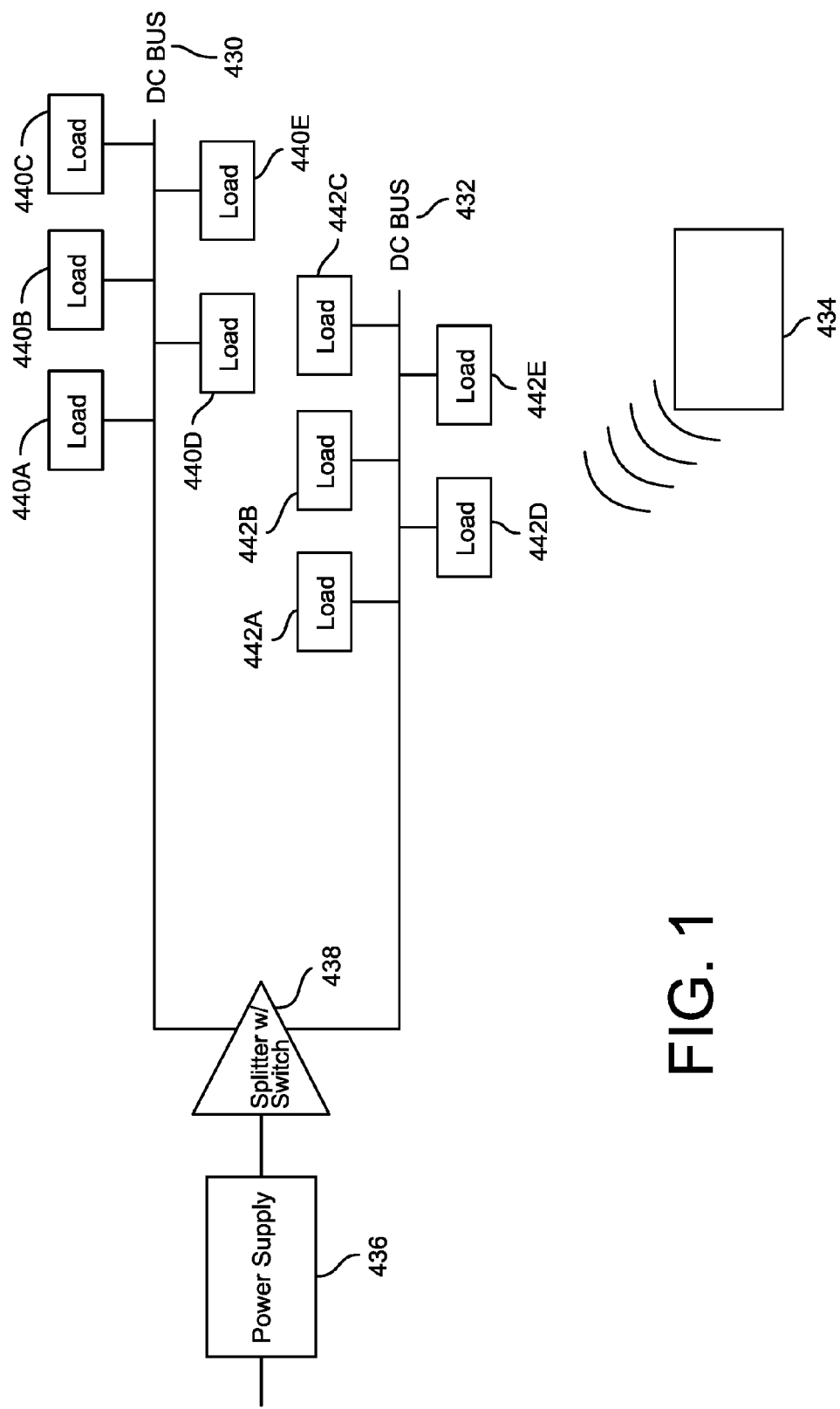
FIG. 1 depicts an example circuit diagram of an example conductive buss system in which a splitter is used to control the power supply to multiple busses.
Figure 10:
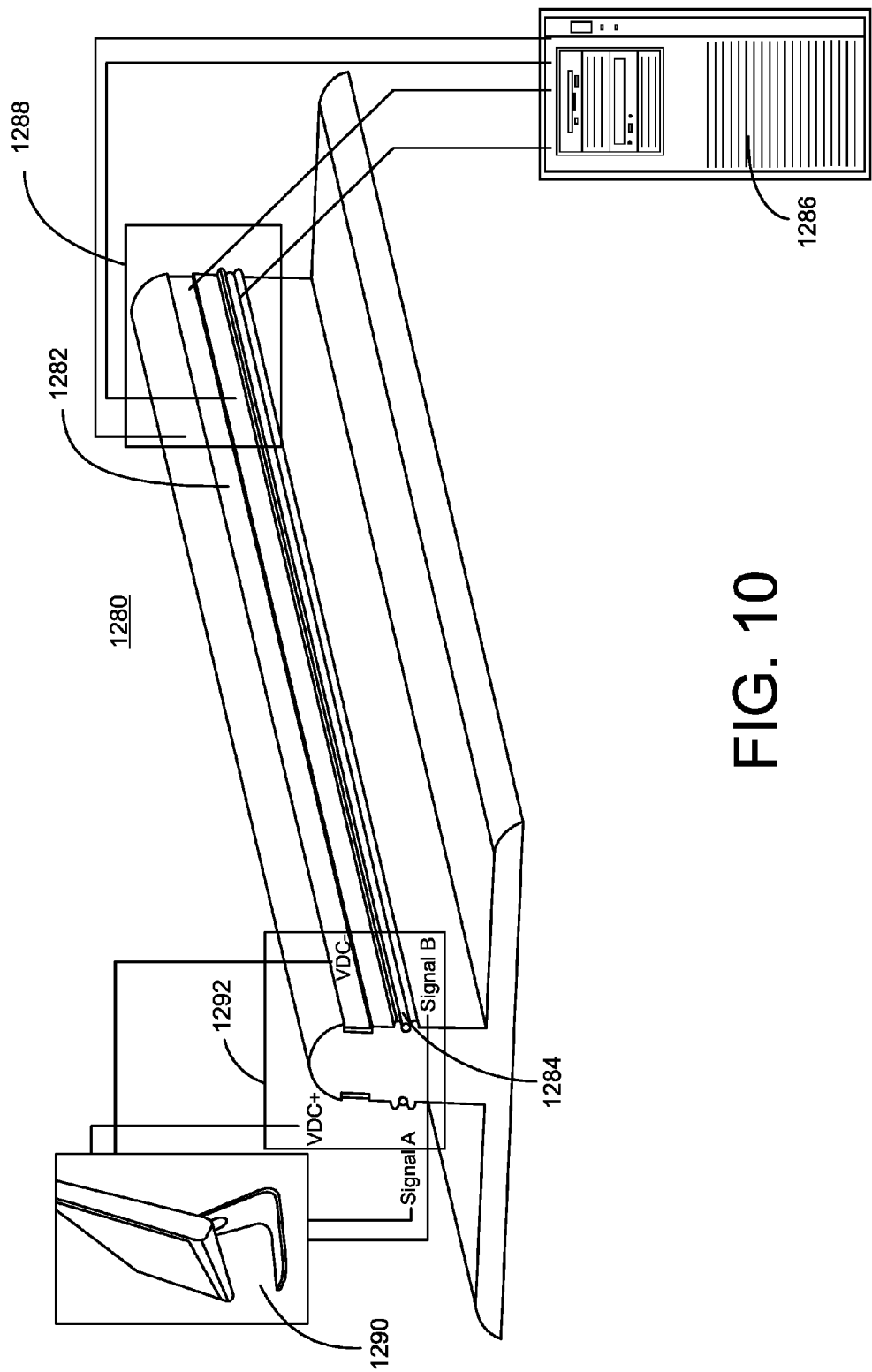
FIG. 10 depicts an example buss system comprised of an electrical buss pair and an integrated communication buss or secondary electrical buss pair mounted to a rail-type carrier.

As shown in FIG. 1, one way of controlling the flow of electrical power (e.g., switching on/off, increasing/decreasing, etc.) to an electrical buss, such as a buss 430 or a buss 432, is through the use of a device 434 capable of providing a control signal, such as a smartphone, tablet computer, sensor or the like. As needed/programmed for any given purpose, the control device 434 may provide one or more control signals to a power supply 436, power source, and/or other devices that causes a mechanism such as a switch 438, for instance, to turn power on and/or off to one or more electrical busses electrically coupled thereto, such as the busses 430, 432. While not required, multiple electrical buses can be provided by using multiple conductive elements with the same carrier as shown in FIGS. 8-10. The example switch 438 may be located in a wire splitter in some examples. In one example, the control device 434 may communicate directly with the switch 438, which in some examples may be oriented between the power supply 436 and the busses 430, 432. Each of the electrical busses 430, 432 may be connected to one or more devices 440A-E, 442A-E drawing a load from each of the busses 430, 432 when energized. Further, control device may utilize any kind of sensing, including, for example, proximity sensing, motion sensing, or the like. By way of example only, when proximity sensing is utilized, the controlling device may function to cut off power to one or more of the electrical busses 430, 432 when the control device is determined to be removed from a given location (e.g., when the control device is embodied in a mobile device) and/or when a user is determined to be beyond a threshold distance from the control device (e.g., when the control device is embodied as an object sensing device). Likewise, when motion sensing is utilized, the controlling device may function to cut off power to one or more of the electrical busses 430, 432 when the control device is not sensed to be stationary and/or when the controlling device fails to sense a motion of a given object, such as user or the like, for a certain period of time. Those of ordinary skill in the art will appreciate that such types of sensing can also be used to turn power on in a similar manner. When a sensor is utilized, it will be understood that the sensor 434 may be built into a power supply 436 or may be located remotely from the power supply 436 as needed for any given purpose. Furthermore, the control device may communicate with the power supply 436 and/or the switch 438 via wiring or wirelessly via any suitable communication protocol.

Figure 2:
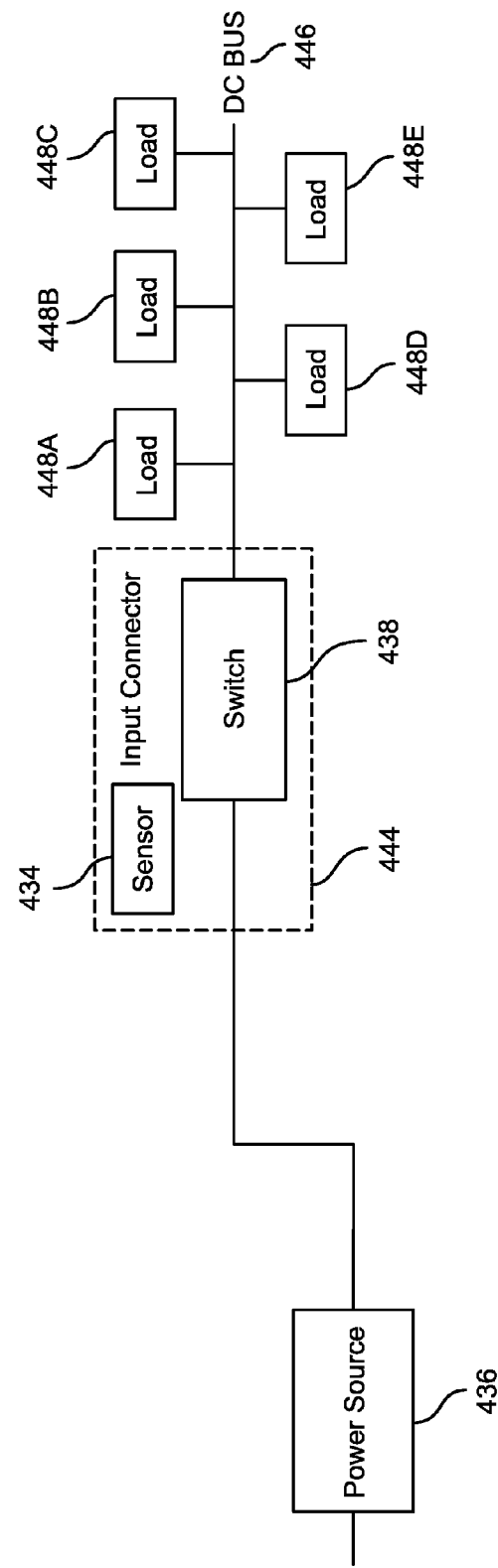
FIG. 2 depicts an example circuit diagram of an example conductive buss system in which a connector includes a switch and a sensor used to control the power supply to the buss.

The present disclosure contemplates a wide variety of configurations beyond the example shown in FIG. 1 of a remote sensor or wireless controlling device. For instance, one such further example configuration is shown in FIG. 2. Accordingly, the example switch 438 and the example sensor 434 are included within a connector 444 providing power from the power source 436 to an electrical buss 446. When energized, the buss 446 may in turn provide a load to a plurality of devices 448A-E. In still other examples, the power supply may include the sensor and/or the switch.

Figure 3:
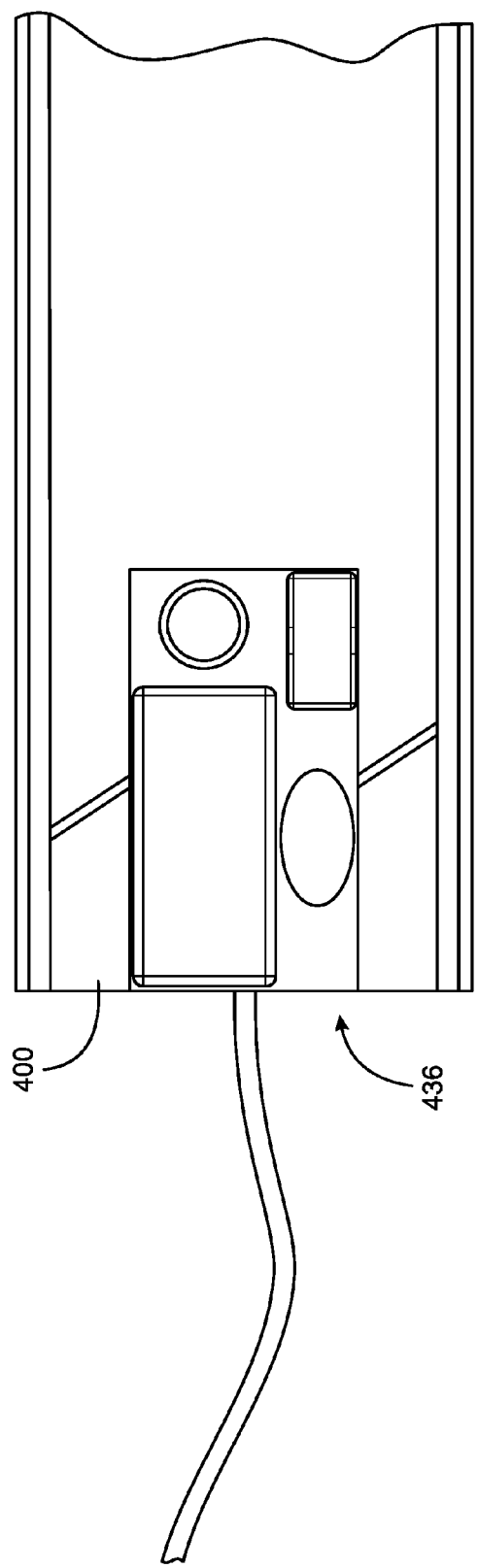
FIG. 3 depicts an example buss system in which the power supply is embedded in the buss carrier.
Figure 21:
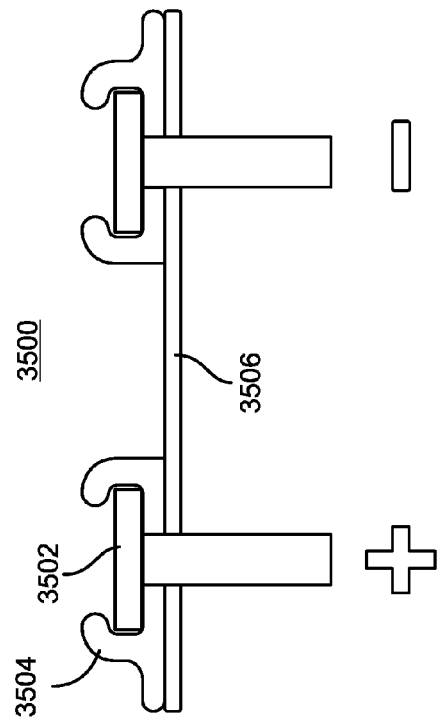
FIG. 21 depicts an example of power being provided to the buss of FIGS. 6B, 6C, 7C and 7D.

Turning to FIGS. 3-7, illustrated are example buss systems that function to reduce the clutter from the required single power supply 436, e.g., a power supply that receives 120V AC as input and which provides 24 V DC as output. FIG. 3 shows a power supply 436 that is integrated directly into a buss carrier 400. FIGS. 4A and 4B illustrate the power supply 436 located within an input connector 427 that is to be coupled to the buss. FIGS. 5A and 5B show a power supply 436 that plugs directly into an AC wall socket 501 while having contacts for simultaneously connecting to the buss. FIGS. 6A, 6B, and 6C depict a power supply 436 housed in an electrical junction box enclosure 437 within a wall so that the power supply 436 does not intrude within the living space at all. In this regard, the power supply may include contacts 439 which are arranged to extend from the power supply 436 to engage with the electrical conductors 451 provided to the buss, for example via openings 453 provided to the backside of the buss as illustrated in FIG. 21. In this regard, the openings 453 may be elongated as needed for any particular purpose or the opening could run the entire length of the buss so as not to limit where the buss needs to be coupled to the input connector. While not shown, it is also contemplated that a cover having an opening through which the contacts 439 extend is to be attached over the junction box 437. FIGS. 7A, 7B, and 7D also shows an input electrical connector 457 that is to be positioned in a mounting surface 455, such as a wall, in order to provide input power to the buss from a remotely located power supply and which provides uninterrupted access to the buss by not utilizing any of the room facing buss surface for delivery of power to the buss. Specifically, FIG. 7A shows the input electrical connector 457 prior to installation in the mounting surface 455, FIG. 7B shows the input electrical connector 457 installed in the mounting surface 455, and FIG. 7C shows the buss (shown in FIG. 7D) installed upon the input electrical connector 457. To maintain the input electrical connector 457 mounted within the mounting surface 455, a resilient locking tab 461 or the like type of structure adapted to engage with a corresponding structure provided to the mounting surface may be provided to the input electrical connector housing as shown.

Turning to FIGS. 8-10, illustrated are example busses 1280 having both a primary electrical power buss 1282, for example provided by conductive elements 1282A and 1282B provided to the carrier, and a secondary buss for electrical power or communication 1284, for example provided by conductive elements 1284A and 1284B provided to the carrier. While not intended to be limiting, the conductive elements may be constructed from a copper alloy material. The communication buss 1284 may comprise communication, networking, PSTN, VOIP, Internet, ethernet, telephone, serial, USB, or any other type of communication buss known in the art. A control device 1286 may be attached to the communication buss 1284 at a first region 1288 of the buss 1280. A peripheral device 1290 is to be attached to the electrical buss 1282 and the communication buss 1284 at a second region 1292 of the buss system 1280, e.g., via use of an output connector or directly in cases where the peripheral device includes an integrated output connector. By way of example, the electrical buss 1282 and the communication buss 1284 allow the control device 1286, e.g., a computer, to communicate with the peripheral device 1290, e.g., a computer monitor, even if the peripheral device 1290 is in a location remote from the control device 1286. The secondary bus could also be useful to provide additional electrical power rather than communication. This would be particularly useful if two or more voltage levels are needed for various loads connected to the buss, if a device requires a dedicated power source, or if more power density is required to adequately provide enough power for the devices attached over the given length of buss. As particularly shown in FIGS. 8A and 8B and FIGS. 9A and 9B, the carrier may also be provided with one or more regions having a ferromagnetic material 1283 for cooperating with one or more magnets provided to a connector (whether input or output) as described further hereinafter.

Figure 11:
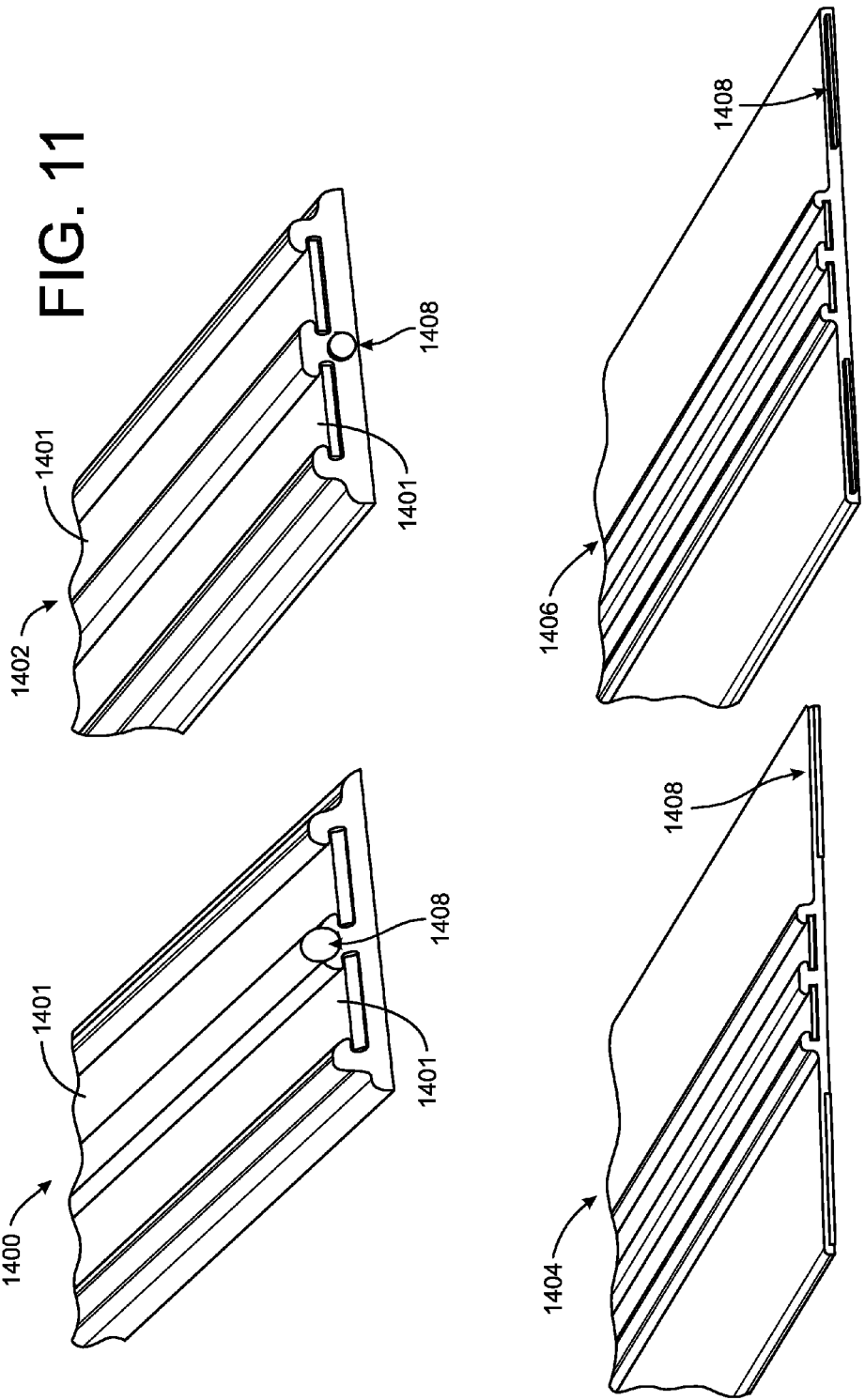
FIG. 11 depicts various example conductive buss cross sections having a non-electrically and non-magnetically conductive extruded carrier, a ferromagnetic material that is used to form a magnetic, mechanical bond with a connector, and electrically conductive material that is used to electrically bond with the connector.

While there are many benefits to busses with particular cross sections, there are likewise many benefits associated with busses formed of particular materials. For example, FIG. 11 illustrates four example busses 1400, 1402, 1404, 1406 that include a ferromagnetic wire 1408 as well as a flexible non-conductive carrier. In some examples, the ferromagnetic wire 1408 allows for a device to be magnetically attached to one of the busses 1400, 1402, 1404, 1406. Thus, in such examples, devices may be electrically and mechanically coupled to the busses 1400, 1402, 1404, 1406 in one step. Furthermore, by using a flexible, non-electrically conductive carrier, the busses can be supplied in a coil form as shown in FIGS. 30A and 30B that will preferably straighten when not constrained. As will be appreciated, the coil form allows for convenient packaging and transportation of long lengths of buss prior to use. One or more of the conductive buss elements 1401 and/or ferromagnetic wire 1408 can be provided with a spring temper such that the buss will be caused to substantially straighten when unpackaged for easy use on walls, desks, and other straight surfaces. Further, to accommodate the attaching of the buss to surfaces of varying lengths, it is contemplated that the buss (including the carrier and the conductor/ferromagnetic elements) may be provided with scorings, perforations, points of weakness or the like 4200 to thereby allow the buss to be easily shortened (by means of mechanical breaking or cutting) to a desired length as illustrated in FIGS. 23A and 23B.

By way of further example, FIGS. 16A and 16B illustrate a buss 3500 having conductive elements 3502 that are each mounted within carrier elements 3504. In this illustrated embodiment, the carrier elements 3504 are formed from an insulating material, such as plastic. The carrier elements 3504 are, in turn, mounted to a further carrier element 3506 which is formed from a ferromagnetic material to thereby allow one or more connectors to be magnetically attached thereto as described above and further illustrated in FIGS. 17A and 17B. In this regard, FIGS. 17A and 17B illustrate a connector 3600 having a magnet 3602, electrical contacts 3604 sized and arranged to engage with the conductor elements 3502 when the connector 3600 is magnetically coupled to the buss system 3500, and a USB port 3606 for allowing DC power from the conductive elements 3502 to be delivered to a device that is coupled to the USB port 3604 via use of a USB cable. Optional protrusions 3608 are also provided to the connector 3600 for use in preventing improper mating between the connector 3600 and buss system 3500, i.e., the protrusions 3608 function as a keying feature as discussed further below. As will be appreciated, other types of ports can be provided to the connector 3600 as needed for a given purpose. It will also be appreciated that the shape and arrangement of the components illustrated may be modified to meet a desired objective. For example, the buss may employ a tubular shape as shown in FIGS. 29A and B.

Figure 12:
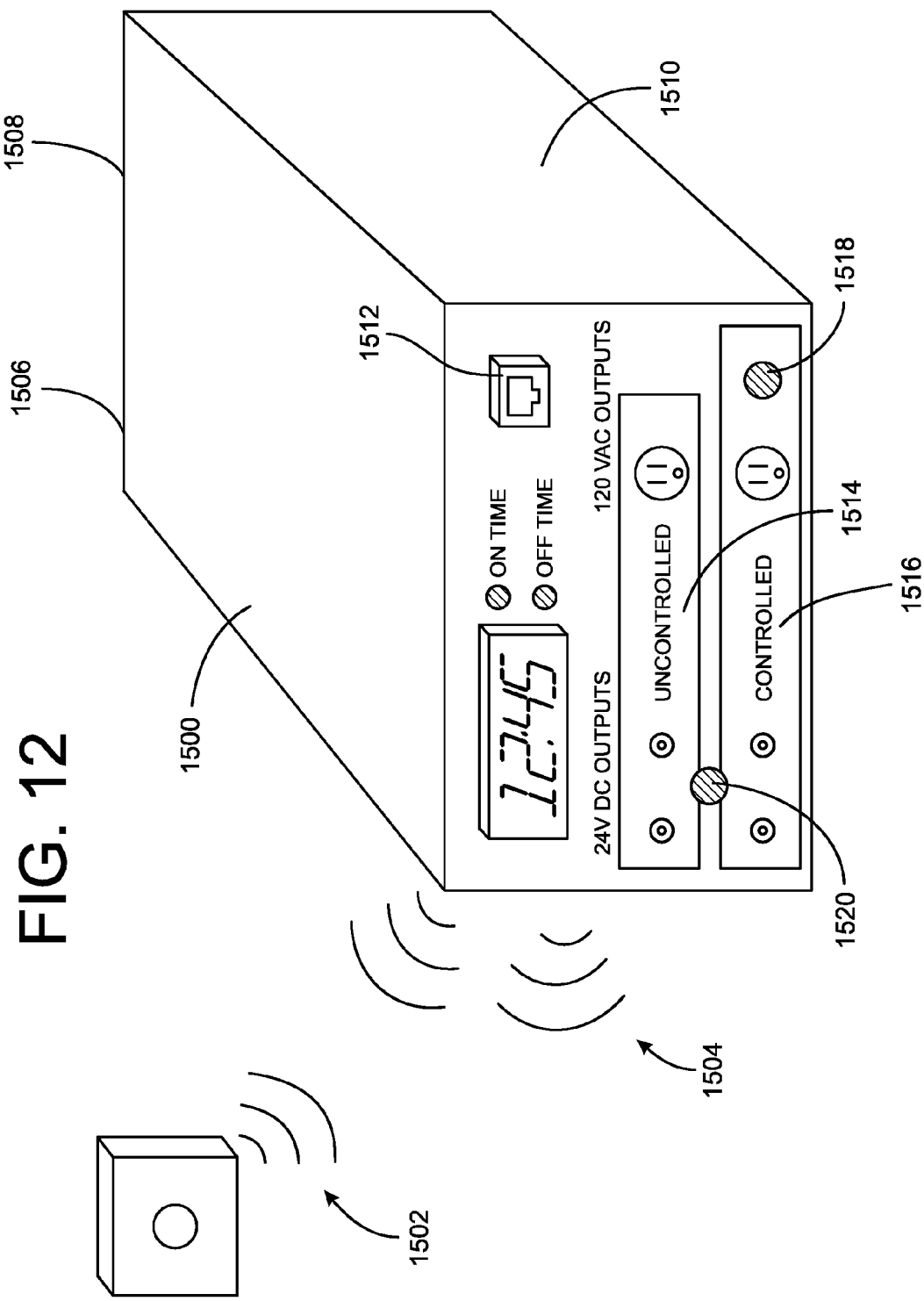
FIG. 12 depicts an example centralized, multi-channel power supply for use with the example buss systems disclosed herein.

Further, FIG. 12 illustrates an example multiple channel power supply 1500. In some examples, the single power supply 1500 replaces and/or otherwise supplements several of the transformer "bricks" that provide low voltage DC power to the many products that utilize rechargeable batteries, e.g., laptops, cellular telephones, smart phones, etc. These transformer "bricks" that convert the AC voltage exiting electrical outlets to the DC voltage necessary to power such devices oftentimes waste energy during the conversion process. The example power supply 1500 reduces the amount of wasted energy. The example power supply 1500 has multiple output channels to supply power to one or more of the example conductive buss systems disclosed herein as well as directly to other loads such as LED lighting.

For instance, the example power supply 1500 may reduce power consumption by communicating with one or more control devices 1502, e.g., sensors and/or smart devices such as smart phone, tablet computers, computers, or the like. The example power supply 1500 communicates with the one or more control devices 1502 wirelessly or via any other suitable communication protocol. In particular, in one example, the one or more control devices 1502 have light sensing capabilities that communicate information relating to the intensity of sensed light to the power supply 1500 to reduce or even cut power to lighting during sunny days, etc. In still other examples, the one or more control devices 1502 may have motion sensing capabilities and/or other suitable sensing capabilities that communicates the absence of a person in the proximate environment to the power supply 1500 to de-energize the electrical buss when the presence of an occupant is not sensed. Likewise, the control device 1502 can send a control signal when the control device senses itself as being outside or within range of the system. In yet other examples, the control device 1502 may have other sensing capabilities for communicating information to the power supply 1500 as needed for any given purpose.

The example power supply 1500 receives power through one or more inputs 1508. The one or more inputs 1508 may receive AC power, DC power or both as desired. By way of example only, the one or more inputs 1508 receive 120 volt AC power, 230 volt AC power, and/or 380 volt DC power.

To prevent unexpected power loss, the example power supply 1500 may include a battery backup 1506. In the illustrated example, the battery backup 1506 provides 24 volt DC power and is integrated into the power supply 1500. Alternatively, the battery backup 1506 may be a peripheral device that is not integrated into the power supply 1500.

To accommodate a variety of power requirements, the power supply 1500 comprises both uncontrolled outputs 1514 and controlled outputs 1516. The uncontrolled outputs 1514 may be used to power devices that are never turned off (or are desired to be controlled locally), while the controlled outputs 1516 are more suitable to power devices that have less consistent energy usage requirements. The uncontrolled outputs 1514 and the controlled outputs 1516 may output power as desired.

Figure 13:
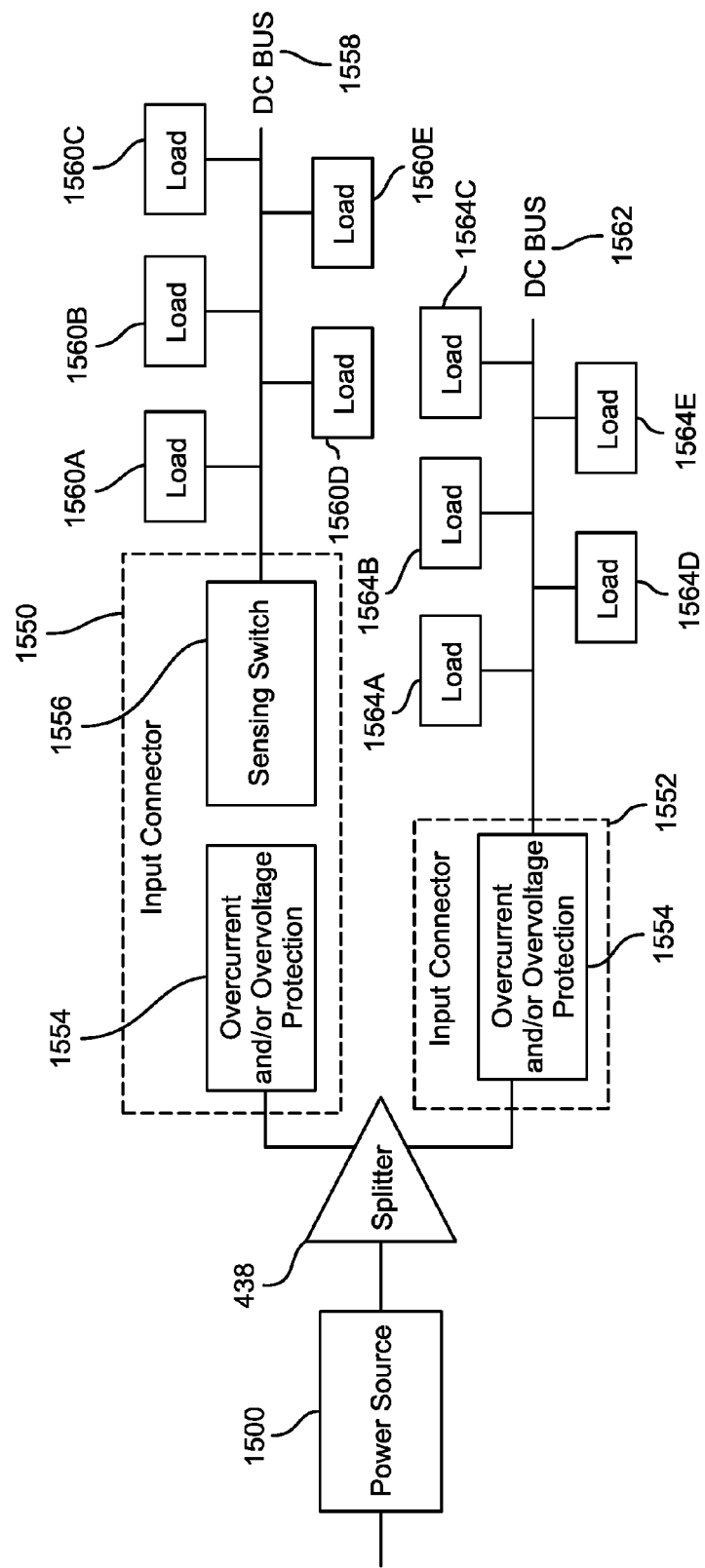
FIG. 13 depicts an example conductive buss system wherein at least one connector includes a mechanism for protecting against overcurrent and/or overvoltage and an optional sensor or sensor switch.

While the power supply 1500 may have functionality to limit or cut power for safety or other reasons, the present disclosure contemplates example connectors 1550, 1552 as shown in FIG. 13 that include a mechanism 1554 for protecting against conditions involving overvoltage and/or overcurrent. This mechanism 1554 may be in addition or in the alternative to the functionality of the power supply 1500. The mechanism 1554 for protecting against overcurrent and/or overvoltage may in some examples operate similar to a fuse, although those having ordinary skill in the art will understand that there a number of ways in which to perform this function. The mechanism 1554 protects against a number of situations, such as, for example, preventing damage or injury to equipment and/or individuals if someone connects an improper power source. In some examples, the connector 1550 includes a sensing switch 1556 for allowing for control of the power to the buss. The sensing switch 1556 may in some examples be associated with a sensor that acts as a further control (e.g., in addition to the power supply 1500, the splitter 438, the mechanism 1554, etc.) as to power delivered to a buss 1558 supporting devices 1560A-E requiring a load. In other examples, however, the connector 1552 does not include a sensing switch in addition to the mechanism 1554 for protecting against overvoltage and overcurrent. As such, the power supply 1500, the splitter 438, and/or the mechanism 1554 operate to control the power supplied to a buss 1562 supporting devices 1564A-E requiring a load.

Figure 15:
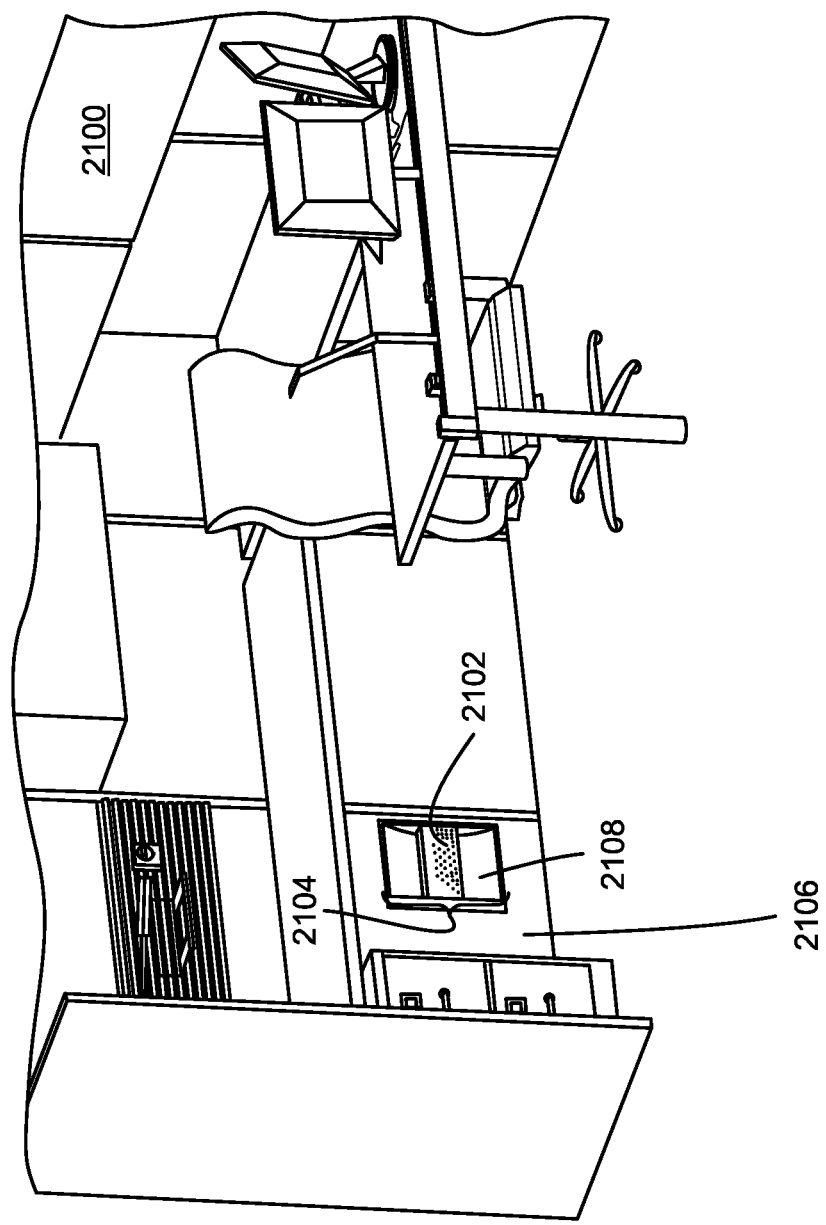
FIG. 15 depicts an example space that houses a power source within an enclosure in a wall cavity.

FIG. 15 illustrates an office space environment 2100 that incorporates a power source 2102. In this example, the power source 2102 is housed within a cavity enclosure 2104 of an office wall 2106. In this regard, one of ordinary skill in the art will recognize that the illustrated cavity enclosure 2104 would preferably be in the form of a junction box. In this example where the wall is a furniture component, the cavity enclosure 2104 has ducting 2108 that permits the convection of air through the office furniture power source 2102. In yet other examples, the power source, in addition to providing power used to power a device, may also charge a battery backup to permit continued use of the device in the event of a short-term power outage. In still further instances as shown in FIG. 6, it may be desirable to place the power source in a junction box enclosure which junction box enclosure may be disposed within a structure, e.g., placed into a wall to hide the power supply from view and to meet local electrical building codes.

Figure 20:
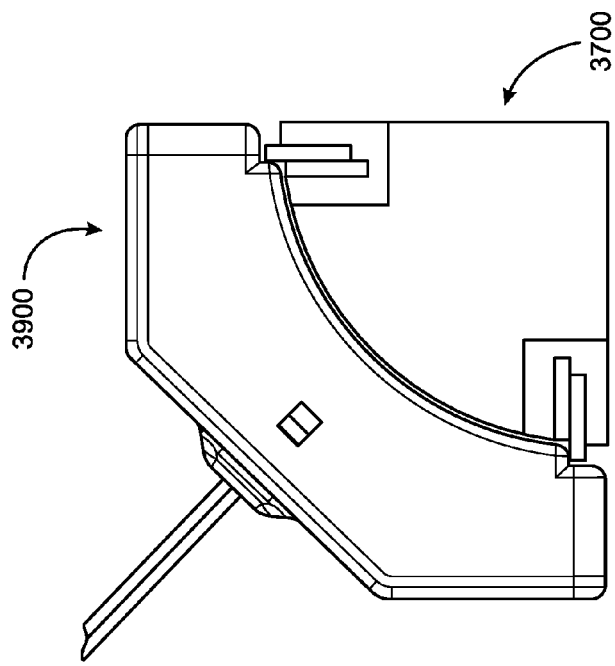
FIG. 20 depicts an example connector connected to a buss having a carrier in the form of a building element.
Figures 25A, 25B:
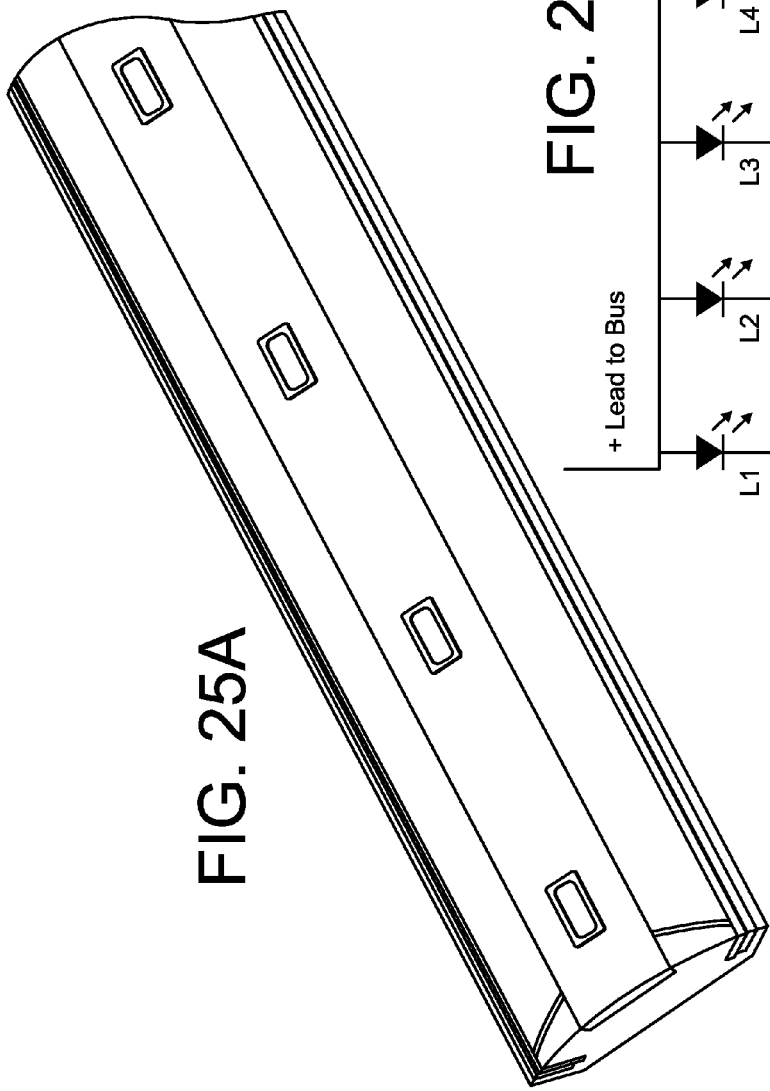

As noted above, the carrier for the electrical conductive elements of the buss can take any desired form. Accordingly, by way of further example, FIGS. 18A and 18B illustrate a buss 3700 in which the carrier is in the form of a piece of building material 3702. While illustrated as being in the particular form of a ¼ round piece of molding, it will be appreciated that other building material can be used for this same purpose, such as tongue and groove flooring shown in FIGS. 31A and 31B. In the illustrated embodiment, the piece of building material 3702 is provided with channels in which are disposed the electrical conductors 3704. For use in magnetically coupling to a connector 3900 having a magnet and a complementary shape and arrangement of power distributing elements (an example of which is illustrated in FIG. 20), the illustrated example building material is also provided with strips of ferromagnetic material 3706. While illustrated as a continuous strip of ferromagnetic material 3706 (to thereby allow the connector 3900 to be placed at any location upon the buss system 3700), it will be appreciated that the ferromagnetic material may be distributed and arranged as desired to meet any desired objective. Furthermore, optional insulating elements 3800 can be provided to the system as illustrated in FIGS. 19A and 19B, e.g., in cases where the carrier is made from a non-insulating material.

As further illustrated in FIGS. 22A and 22B, the connector 3900 may be provided with ports and/or wires/cables for use in allowing the connector 3900 to be coupled to a device requiring power and/or signals from the buss system. In addition, as illustrated in FIG. 21, power may be supplied to the buss from a power source that is disposed on the same side of the carrier as the conductive elements or from the opposite side as desired for any purpose. In circumstances where the buss system in required to traverse a corner, such as illustrated in FIGS. 22A and 22B, conventionally known and complimentary shaped jumper elements may be provided to facilitate electrical engagement between conductor elements of adjacent busses.

Figures 35A, 35B:
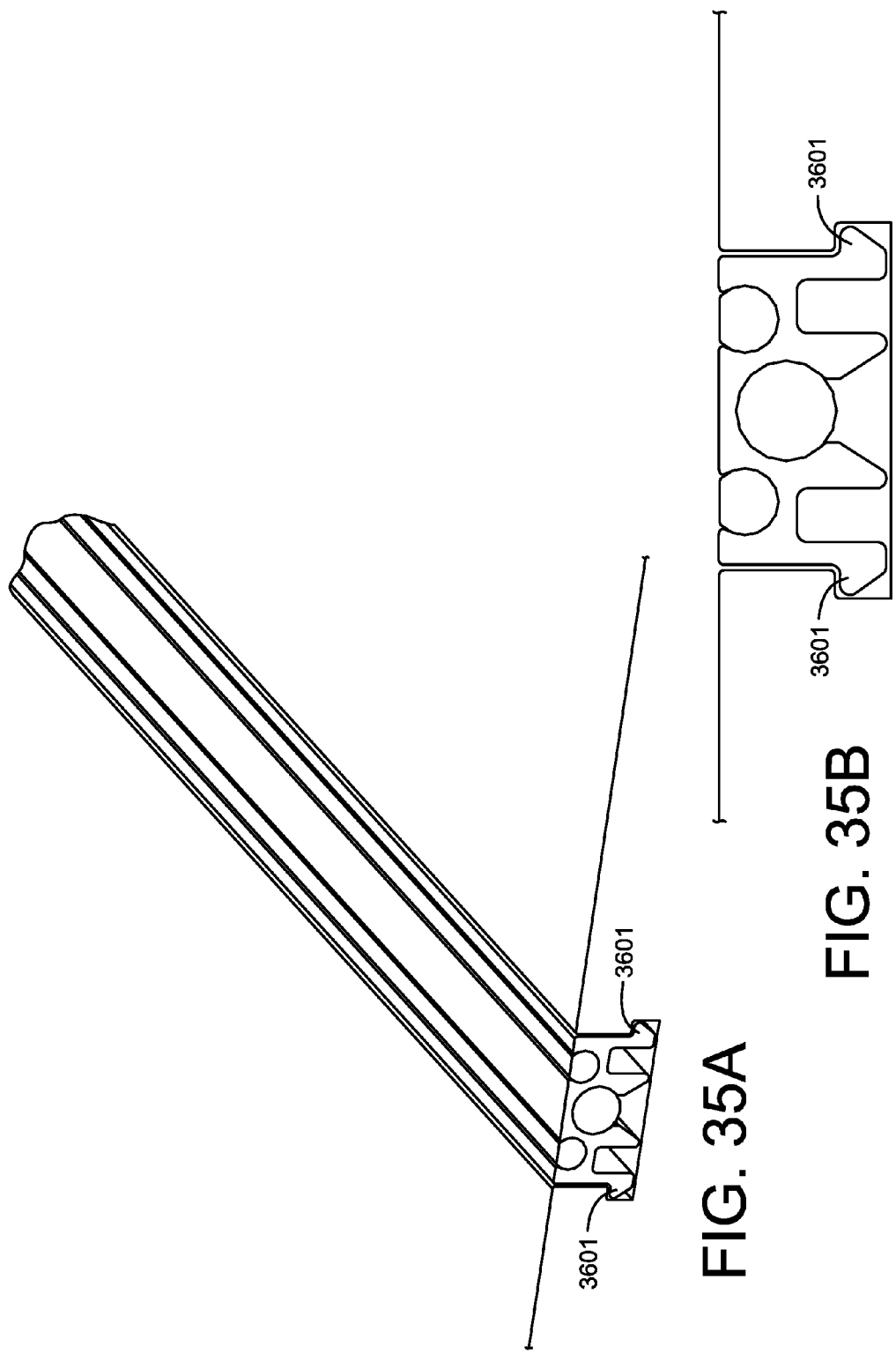
FIGS. 35A and 35B depict a buss with a flush mating surface and a buss carrier having deflectable undercuts for holding the buss carrier to a mounting surface.
Figure 39B:
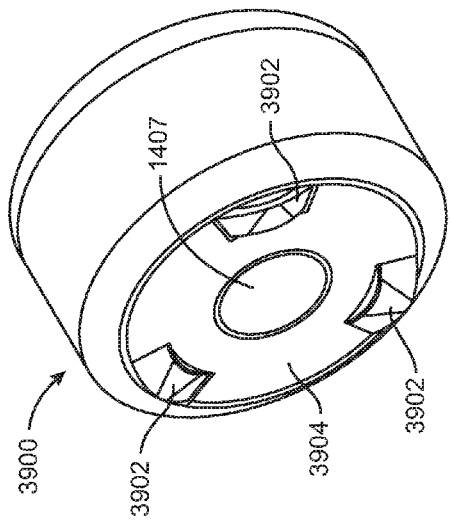
FIGS. 39A-39D depict a connector having contacts arranged to allow for rotation of the connector relative to the buss.
Figure 39D:
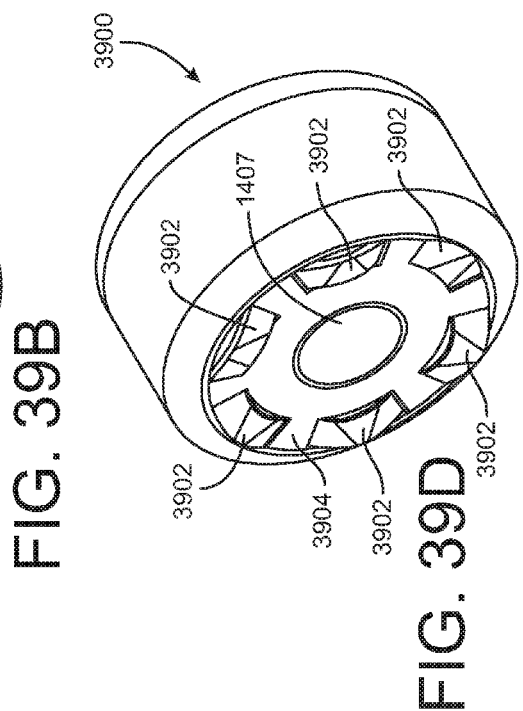
Figure 39A:
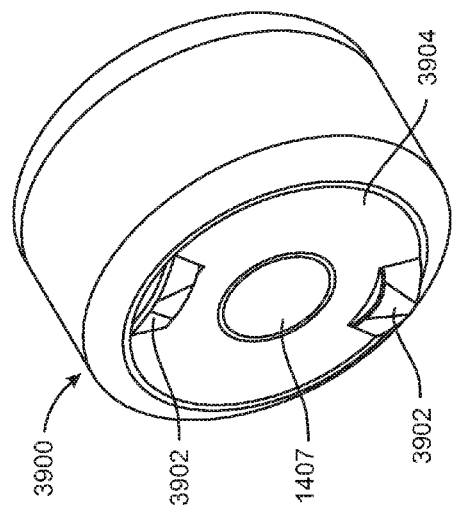
Figure 39C:
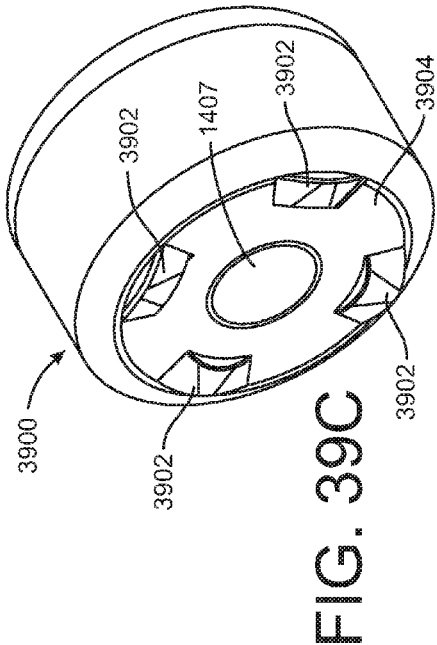

It may also be useful to access power from the floor in the center of a room or from a desktop. In such situations, a buss that is intended to be installed flush with a surface, e.g., a floor, is preferred to prevent ridges from causing tripping hazards, and depressions that could collect dirt, as shown in FIGS. 31-37. The flush buss could also be advantageous in wall applications, desk top, etc. Furthermore, the carrier 3201 may be provided with a shape, such as a trapezoidal shape, that provides an undercut to hold the carrier in place in a correspondingly shaped receiver 3203 provided to a piece of building material 3205, a desk, or other form of carrier/mounting surface as shown in FIGS. 33A-C and 34A-B. Similarly, the electrical conductive elements 1401 can be provided with a shape having an undercut to hold the buss in a carrier as also shown in FIG. 34-35. Furthermore, FIGS. 35A and 35B shows a carrier with deflectable undercuts 3601 that would be useful if the installer does not have access to the end of the slot in the mounting surface. A flush system may also be useful in other flooring applications. For example, FIGS. 36A and 36B shows a carrier configuration with undercuts to be positioned under a bottom surface of a carpet 3701 with the portion of the carrier that carries the conductive elements still being flush with the top surface of the carpet 3701.

Another form of the buss is shown in FIGS. 14A-D. In the illustrated buss, the buss carrier 1401 includes one, narrow, linear ferromagnetic strip 1403 and the connector 1405 (whether input or output) includes one or more magnets 1407 arranged to provide a single, linear magnetic field. In this manner, the magnetic relationship between the magnet(s) 1407 and the ferromagnetic strip 1403 would assure that the connector 1405 mounts to the buss carrier 1401 in one of only two positions, i.e., the magnetic field will cause a misaligned connector 1405 to self-correct into alignment for proper connection as shown in FIGS. 14C and 14D. Since either of these positions are intended to provide electrical contact between the connector contacts and the electrical busses, a good connection is assured by simply placing the magnetic connector close enough to the buss system to allow the magnetic field to pull them together. If needed, the connector and the buss can be provided with complimentary keying features to ensure that the connector is only capable of being coupled to the buss in only one of the two positions.

Illustrated in FIGS. 38A-38C is a further embodiment of a keyed connector 1405' wherein the connector 1405' is provided with a keying feature. While the keying feature is illustrated as being a pair of elongated surfaces 3800 that extend outwardly from opposed sides of the connector 1405' relative to the contact carrying surface of the connector 1405', it will be appreciated that the keying feature can include one or more surfaces that extend along all of or a portion of the sides or surfaces of the connector 1405' so long as the provided keying feature is cooperable with one or more surfaces of the buss 1401 to provide the needed functionality of preventing the contacts of the connector 1405' from engaging with the conductors of the buss 1401 when the connector 1405' is not properly seated upon the buss 1401 as particularly shown in FIG. 38B, i.e., the illustrated keying features 3800 will engage with a face of the buss 1401 when the connector 1405' is not properly aligned with the buss 1401 and, as a result, the illustrated keying features 3800 will function to maintain one or more of the contacts of the connector 1405' in a spaced, non-conductive condition relative to the conductors of the buss 1401. In contrast, when the connector 1405' is properly aligned with the buss 1401, as shown in FIG. 38C, the illustrated keying features 3800 will be positioned at opposed sides of the buss 1401 and, as such, the keying features 3800 will not engage with any surfaces of the buss 1401 to thereby interfere with the ability of the conductors of the connector 1405' to electrically engage with the conductors of the buss 1401.

Illustrated in FIGS. 39A-39D is a further connector 3900 having a centrally disposed magnet 1407 and at least two electrical contacts 3902 arranged concentrically there around. While the illustrated connector 3900 is shown as having a cylindrically shaped body, it will be appreciated that other forms can be utilized. As will be appreciated, by arranging the plurality of electrical contacts 3902 concentrically upon the mating surface 3904 of the connector 3900, the connector can be placed upon the buss 1401 in a correspond, plurality of rotational positions in which at least two of the electrical contacts 3902 will be electrically engaged with the conductors of the buss 1401. Thus, when a side of the connector 3900 is provided with a USB port, a cable, a lighting element, or the like, a user can rotate the connector 3900 relative to the buss 1401 to position the USB port, cable, lighting element, or the like in a desired location. It will also be appreciated that the connector 3900 can be provided with other elements, such as ports or other power consuming features, as needed for any given purpose.

While the foregoing illustrates a connector 3900 that is rotatable over 360 degrees in steps relative to the buss 1401 (wherein the number of rotational steps is determined as a function of the number of electrical contacts 3902 provided to the connector 3900), it is further contemplated that a connector adaptor 3900' can be used to provide for rotation of a connector to any desired position over a full 360 degrees relative to the buss 1401. To this end, a surface 3906 of the connector adaptor 3900' that is opposite to the contact carrying surface 3904 of the connector adaptor 3900' can be provided with at least a pair of arcuately shaped conductors 3908 that are to be electrically engaged with contacts 4102 of cooperable connector 4100 shown in FIGS. 41A and 41B when connector 4100 is seated upon surface 3906 of connector adaptor 3900'. To this end, the connector 4100 may also be provided with a magnet for use in attaching/aligning the connector 4100 upon surface 3906 of connector adaptor 3900'. In some circumstances, the surface 3906 can be recessed within the body of the connector adaptor 3900' to thereby allow the connector 4100 to seat in alignment within the body of the connector adaptor 3900'. As will be appreciated, the use of the arcuately shaped conductors 3908 allows the connector 4100 to be freely rotated over 360 degrees relative to the buss 1401 to thereby allow a user to locate a feature provided to the conductor 4100, such as the illustrated USB port, in any desired position.

While the foregoing describes a connector 4100 that is releasably positionable within a connector adaptor 3900', it is also contemplated that the connector 4100 can be rotatably attached directly to a connector base 3900" as further illustrated in FIGS. 41A and 41B. In this case, the connector base 3900" can itself be positioned upon the buss 1401 (without the need for using the connector adaptor 3900') or the connector 4100 can be used as described above, i.e., with the connector base 3900" being releasably engaged with connector adaptor 3900'.

Figure 47:
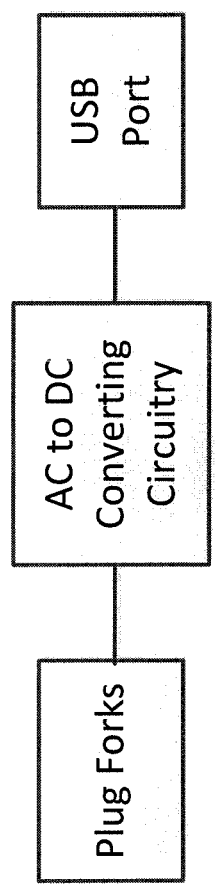
FIG. 47 depicts a circuit for use in converting AC power, received via plug forks, to DC power.

Illustrated in FIGS. 42A-42C is a further connector adaptor 4100' having a pair of retractable, AC plug forks 4200. In the illustrated connector adaptor 4100', the plug forks 4200 may be folded into slots 4202 provided to the contact mounting surface 3906. As will be appreciated, the plug forks 4200 would be coupled to circuitry for converting AC power to low voltage DC power to, for example, provide low voltage DC power to a USB port, power consuming element, or the like provided to the connector adaptor 4100' as shown in FIG. 47. In this manner, the connector adaptor 4100' can be coupled to an AC power outlet, coupled to the buss 1401 (with the forks 4200 retracted or folded), or coupled to connector adaptor 3900'(again with the forks 4200 folded or retracted) as desired. While not required, the connector adaptor 4100' is again illustrated as being provided with an optional rotatable base 3900" which rotatable base supports the contacts 4102 and the plug forks 4200. It will also be appreciated that the connector adaptor need not be provided with contacts 4102, as illustrated in FIGS. 43A-43C in which case the connector adaptor 4100" would be usable with an AC power outlet alone. Likewise, it will be appreciated that the plug forks 4200 can be provided to any surface of the connector adaptor.

FIGS. 37A-C shows another version of flush buss system in which both the electrical conductive elements 3801 and ferromagnetic strips 3803 are thin strips mounted to tape. The thin tape would allow the ferromagnetic strip 3803 to be mounted on the underside of the tape and still provide sufficient magnetic attraction to the connected devices. In the example illustrated in FIG. 37C, one of the electrically conductive elements also provides the functionality of the ferromagnetic strip.

FIGS. 44A and 44B illustrate a still further connector 4100' having a power plug portion 4400. The power plug portion in provided with electrical contacts 4402 for engaging with electrical conductors of a power port, such as a cigarette lighter. The connector 4100' may include circuitry as needed for converting power drawn from the power port, e.g., 12 VDC, to power to the provided to a power drawing device or port provided to the connector 4100' as described previously.

Figure 45B:
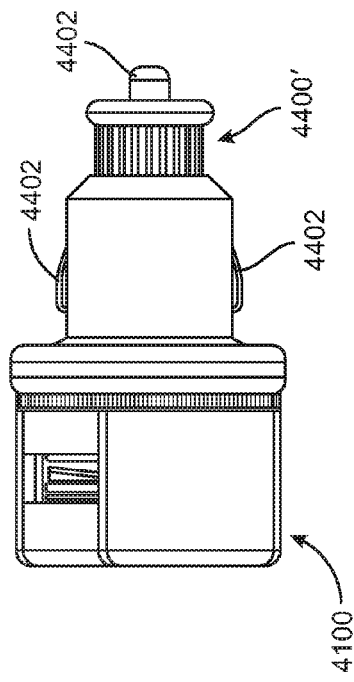
FIGS. 45A-45B depict a further connector adaptor having a power plug.
Figure 45C:
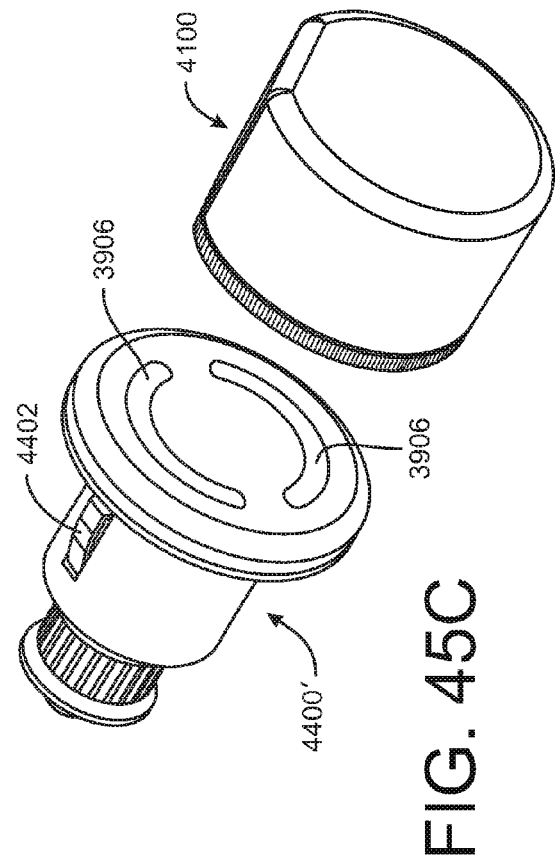
Figure 45A:
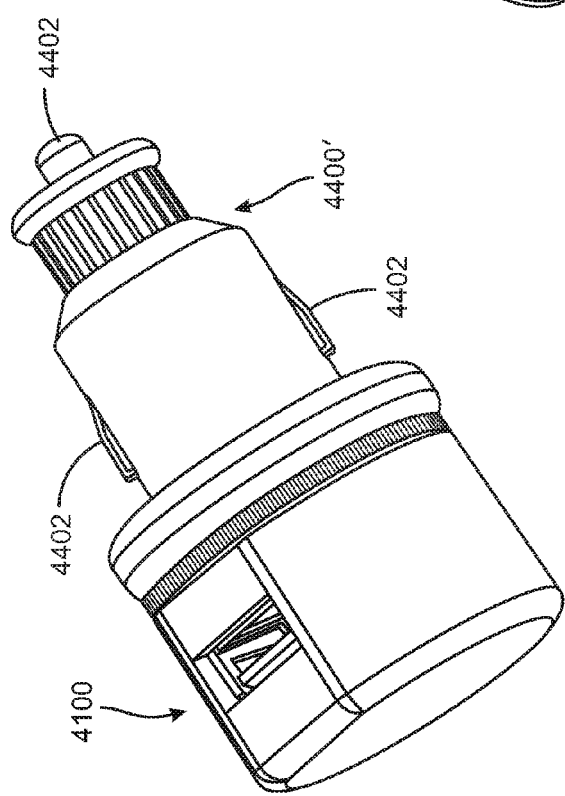

As shown in FIGS. 45A-45C, it is also contemplated that the power plug portion and connector can be provided as separable elements. To this end, a power plug adaptor 4400' would include the contacts 4402 as described previously and would additionally include electrical contacts 3906 for engaging with contacts of a connector, such as connector 4100. While not required, the electrical contacts 3906 may be arcuate in shape to provide for 360 degree connectivity with the connector 4100. It is also contemplated that the power plug adaptor 4400' may include a magnet that is cooperable with a magnet provided to the connector 4100 to thereby allow the connector to be releasably coupled to the power plug adaptor 4400'. Preferably, circuitry as needed for converting power drawn from the power port, e.g., 12 VDC, to power to the provided to a power drawing device or port provided to the connector 4100 as described previously would be included within the power plug adaptor 4400' to thereby allow the connector 4100 to be universally used with many different types of adaptors. It will be appreciated, however, that the connector 4100 can also be provided with circuitry for converting different types of electrical inputs to different types of electrical outputs as desired.

In some circumstances, a magnet 4120 provided for use in coupling a connector or connector adaptor with a buss can be also used to obtain an electrical signal, such as a communication signal, from a ferrous element 4602 provided to a buss 4600 as shown in FIGS. 46A and 46B. While not required, the magnet 4120 can be provided with one or more protuberances 4102 for ensuring a good mating connection with the ferrous element 4602 particularly in the case where the ferrous element is recessed within the buss carrier as particularly illustrated in FIG. 46A.

Turning now to FIGS. 24A-B and 25A-B, a further exemplary buss system is shown having integrated LED lighting, thus providing lighting and additional access to power through the integrated buss. In FIGS. 24A-B, the LEDs are directly attached to the bus conductors while in FIGS. 25-B the bus conductors are attached to an integrated LED circuit.

Figure 27:
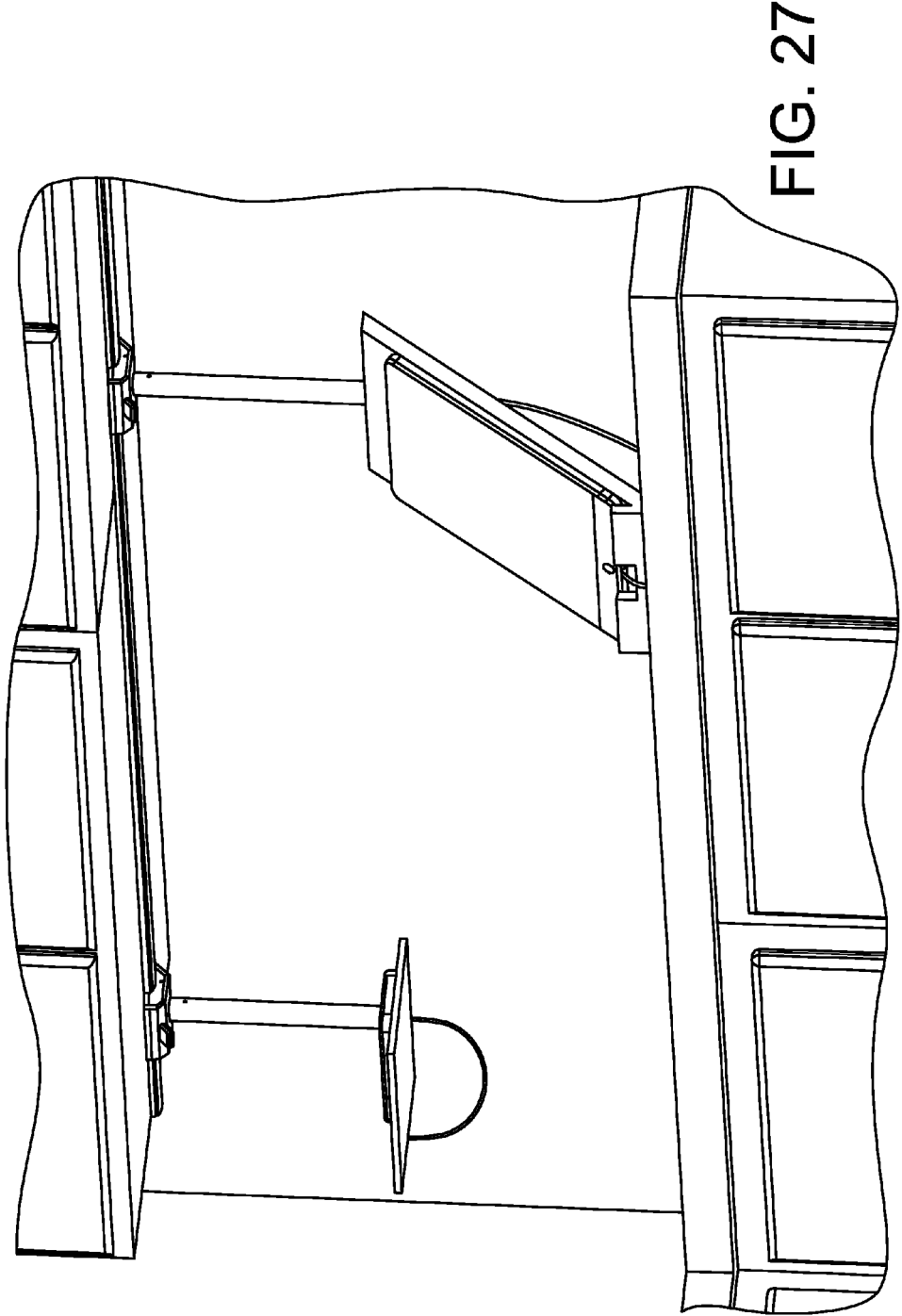

FIG. 26 illustrates an exemplary system installed in a deck environment and FIGS. 27 and 28 illustrate an exemplary system installed in a kitchen. It is to be understood, however, that the exemplary environments described herein are not intended to be limiting and the subject systems and method can be used in any location in which low voltage power distribution is desired.

It will also be appreciated that the conductive elements can be covered with a removable substrate, such as a film, to protect the conductive elements should one desire to paint the carrier.

While specific embodiments of the subject invention have been described in detail, it will be appreciated by those skilled in the art that various modifications and alternatives to those details could be developed in light of the overall teachings of this disclosure. For examples, those skilled in the art should appreciate that one or more features and components of each described embodiment may be incorporated into other described embodiments to perform the same functions as need for a given purpose. It will therefore be appreciated that features described are not to be limited to any particular embodiment but may be freely used across embodiments where applicable. Additionally, it will be appreciated that the size, shape, arrangement, and/or number of components illustrated and described can be changed as necessary to meet a given need. Accordingly, the embodiments described and illustrated are not intended to limit the scope of the invention which is to be given the full breadth of the appended claims and any equivalents thereof.

What is claimed is:

1. A device for connecting to an electrical bus comprising a carrier, at least a pair of electrically conductive elements providing DC power linearly arranged along a mating surface of the carrier, and a linearly arranged ferromagnetic element carried by the carrier, the device comprising:

a housing adapted to be releasably couplable to the electrical bus, the housing having a mating surface adapted to be disposed upon the mating surface of the carrier, the mating surface of the housing carrying at least three electrically conductive contacts wherein the at least three electrically conductive contacts are concentrically arranged on the mating surface of the housing about an axis that is perpendicular to the mating surface of the carrier when the housing is disposed on the carrier such that the mating surface of the housing is rotatable about the axis that is perpendicular to the mating surface of the carrier to allow the mating surface of the housing to be disposed in a plurality of positions upon the mating surface of the carrier in each of which at least two of the electrically conductive contacts engage with the at least a pair of electrically conductive elements, a magnet arranged to generate a magnetic field to magnetically cooperate with the ferromagnetic element, and an output port electrically coupled to the at least three electrically conductive contacts for providing DC power received from the at least the pair of electrically conductive elements via the at least two of the electrically conductive contacts engaged with the at least the pair of electrically conductive elements to a further device couplable to the output port.

2. The device as recited in claim 1, wherein the ferromagnetic element carries an electrical signal and the magnet is arranged to engage with the ferromagnetic element to receive the electrical signal.

3. The device as recited in claim 2, wherein the electrical signal received from the ferromagnetic element via the magnet is provided to the output port.

4. The device as recited in claim 1, wherein the housing further comprises a pair of forks insertable into an AC power outlet and the pair of forks are coupled to a circuit for converting AC power received from the AC power outlet via the pair of forks to DC power for provision to the output port.

5. The device as recited in claim 1, wherein the housing comprises an upper portion and a base portion that is rotatable relative to the upper portion and wherein the base portion comprises the mating surface of the housing.

6. The device as recited in claim 5, wherein the upper portion comprises the output port.

7. The device as recited in claim 6, wherein one of the base portion and the upper portion further comprises a pair of forks insertable into an AC power outlet and the pair of forks are coupled to a circuit for converting AC power received from the AC power outlet via the pair of forks to DC power for provision to the output port.

8. The device as recited in claim 1, wherein the magnet is positioned on the axis that is perpendicular to the mating surface.

9. A device for connecting to an electrical bus comprising a carrier, at least a pair of electrically conductive elements providing DC power linearly arranged along the carrier, and a linearly arranged ferromagnetic element carried by the carrier, the device comprising:

a housing adapted to be releasably couplable to the electrical bus, the housing having at least three, concentrically arranged, electrically conductive contacts arranged such that at least two of the electrically conductive contacts engage with the at least a pair of electrically conductive elements when the housing is releasable coupled to the electrical bus, at least one magnet arranged to generate a magnetic field to magnetically cooperate with the ferromagnetic element, an output port electrically coupled to the at least three electrically conductive contacts for providing DC power received from the at least the pair of electrically conductive elements via the at least two of the electrically conductive contacts engaged with the at least the pair of electrically conductive elements to a further device couplable to the output port, a pair of forks insertable into an AC power outlet, and a circuit coupled to the pair of forks for converting AC power received from the AC power outlet via the pair of forks to DC power for provision to the output port.

10. The device as recited in claim 9, wherein the ferromagnetic element carries an electrical signal and the magnet is arranged to engage with the ferromagnetic element to receive the electrical signal.

11. The device as recited in claim 10, wherein the electrical signal received from the ferromagnetic element via the magnet is provided to the output port.

12. The device as recited in claim 9, wherein the housing comprises an upper portion and a base portion that is rotatable relative to the upper portion and wherein the at least three-concentrically arranged, electrically conductive contacts are disposed on the base portion.

13. The device as recited in claim 12, wherein the upper portion comprises the output port.

14. The device as recited in claim 13, wherein one of the base portion and the upper portion comprises the pair of forks.

* * * * *